(12) United States Patent
Makrides-Saravanos et al.

(10) Patent No.: US 10,266,367 B2
(45) Date of Patent: Apr. 23, 2019

(54) TRANSFORMABLE CABLE REELS AND RELATED ASSEMBLIES AND METHODS

(71) Applicant: Corning Optical Communications LLC, Hickory, NC (US)

(72) Inventors: Elli Makrides-Saravanos, Highland Village, TX (US); Daniel Scott McGranahan, Fort Worth, TX (US); John Henry Vynalek, Clemmons, NC (US)

(73) Assignee: Corning Optical Communications LLC, Hickory, NC (US)

( * ) Notice: Subject to any disclaimer, the term of this patent is extended or adjusted under 35 U.S.C. 154(b) by 4 days.

(21) Appl. No.: 15/066,068

(22) Filed: Mar. 10, 2016

(65) Prior Publication Data

US 2016/0185567 A1  Jun. 30, 2016

Related U.S. Application Data

(60) Division of application No. 14/070,995, filed on Nov. 4, 2013, now Pat. No. 9,309,086, which is a
(Continued)

(51) Int. Cl.
*G02B 6/36* (2006.01)
*B65H 75/24* (2006.01)
(Continued)

(52) U.S. Cl.
CPC ............. *B65H 75/24* (2013.01); *B65H 54/10* (2013.01); *B65H 54/12* (2013.01);
(Continued)

(58) Field of Classification Search
CPC .................................................. G02B 6/4457
See application file for complete search history.

(56) References Cited

U.S. PATENT DOCUMENTS

| 63,519 A | 4/1867 | Horton |
| 417,424 A | 12/1889 | Hochspeier et al. |

(Continued)

FOREIGN PATENT DOCUMENTS

| CN | 2528753 Y | 1/2003 |
| JP | 54 084580 U | 6/1979 |

(Continued)

OTHER PUBLICATIONS

Patent Cooperation Treaty, International Search Report and Written Opinion, International Application No. PCT/US2012/037082, dated Aug. 7, 2012, 13 pages.
(Continued)

*Primary Examiner* — Thomas A Hollweg
*Assistant Examiner* — Mary A El-Shammaa
(74) *Attorney, Agent, or Firm* — Grant A. Gildehaus

(57) ABSTRACT

Transformable cable reels, related assemblies and methods are disclosed. The transformable cable reels may be provided in a first reel configuration for spooling on cable to the transformable cable reel and to pay out the spooled cable from the transformable cable reel. Cable spooled on the transformable cable reel may be payed out during cable installations. The transformable cable reel may also be configured in a second reel configuration for storage of any excess cable after cable payout. As one non-limiting example, the volume of the cable reel may be less in the second reel configuration than in the first reel configuration so that less volume is required to store the transformable cable reel. Providing the transformable cable reel in the second reel configuration may make it more feasible to store the transformable cable reel in fiber optic equipment, and/or avoid storing excess cable removed from a cable reel.

8 Claims, 27 Drawing Sheets

Related U.S. Application Data continuation of application No. PCT/US2012/037082, filed on May 9, 2012.

(60) Provisional application No. 61/485,909, filed on May 13, 2011.

(51) Int. Cl.
*B65H 54/12* (2006.01)
*B65H 54/10* (2006.01)
*G02B 6/38* (2006.01)
*G02B 6/44* (2006.01)

(52) U.S. Cl.
CPC ........ *B65H 2701/32* (2013.01); *G02B 6/3604* (2013.01); *G02B 6/3897* (2013.01); *G02B 6/4452* (2013.01); *G02B 6/4457* (2013.01)

(56) References Cited

U.S. PATENT DOCUMENTS

| | | | |
|---|---|---|---|
| 2,046,883 | A | 7/1936 | Robbins |
| 2,170,764 | A | 4/1939 | Penman |
| 2,463,192 | A | 3/1949 | Mackey et al. |
| 2,511,701 | A | 6/1950 | Eldredge |
| 3,058,688 | A | 10/1962 | Abel |
| 4,381,087 | A | 4/1983 | Williams |
| 5,246,184 | A * | 9/1993 | Trewhella, Jr. ........ B65H 75/18 242/125.1 |
| 5,450,509 | A | 9/1995 | Davis |
| 5,710,855 | A | 1/1998 | Konwitz |
| 5,915,062 | A * | 6/1999 | Jackson ............... G02B 6/4457 242/571.5 |
| 6,301,424 | B1 | 10/2001 | Hwang |
| 6,571,047 | B1 | 5/2003 | Yarkosky et al. |
| 6,612,515 | B1 | 9/2003 | Tinucci et al. |
| 7,079,745 | B1 | 7/2006 | Weinert et al. |
| 7,477,839 | B2 | 1/2009 | Funahashi et al. |
| 2002/0131749 | A1 * | 9/2002 | Swenson ............... G02B 6/4453 385/135 |
| 2003/0038209 | A1 | 2/2003 | Remeczky |
| 2003/0095772 | A1 | 5/2003 | Solheid et al. |
| 2005/0201710 | A1 | 9/2005 | Clark et al. |
| 2005/0226588 | A1 | 10/2005 | Pons |
| 2008/0011990 | A1 * | 1/2008 | Kostet ............... G02B 6/4457 254/134 |
| 2008/0292261 | A1 | 11/2008 | Kowalczyk et al. |
| 2008/0296426 | A1 | 12/2008 | Cairns et al. |
| 2010/0166376 | A1 | 7/2010 | Nair et al. |
| 2011/0280536 | A1 | 11/2011 | de los Santos Campos et al. |
| 2012/0093474 | A1 | 4/2012 | Cox et al. |
| 2012/0104145 | A1 | 5/2012 | Dagley et al. |
| 2013/0183017 | A1 | 7/2013 | de los Santos Campos et al. |

FOREIGN PATENT DOCUMENTS

| | | |
|---|---|---|
| JP | 64-9965 | 1/1989 |
| JP | 64 009965 U | 1/1989 |
| JP | 6-305682 | 11/1994 |
| WO | WO 2009048680 A9 | 4/2009 |

OTHER PUBLICATIONS

Final Office Action for U.S. Appl. No. 13/348,929 dated Oct. 15, 2014, 8 pages.

Notice of Allowance for U.S. Appl. No. 13/275,815 dated Nov. 13, 2014, 9 pages.

Non-final Office Action for U.S. Appl. No. 13/348,929 dated Dec. 23, 2013, 8 pages.

Non-final Office Action for U.S. Appl. No. 13/275,815 dated Jul. 17, 2014, 9 pages.

Advisory Action for U.S. Appl. No. 13/348,929 dated Mar. 13, 2015, 2 pages.

Notice of Allowance for U.S. Appl. No. 13/275,815 dated Jan. 27, 2015, 9 pages.

Chinese Search Report, Application No. 2012800233763, dated Mar. 20, 2015, 2 pages.

* cited by examiner

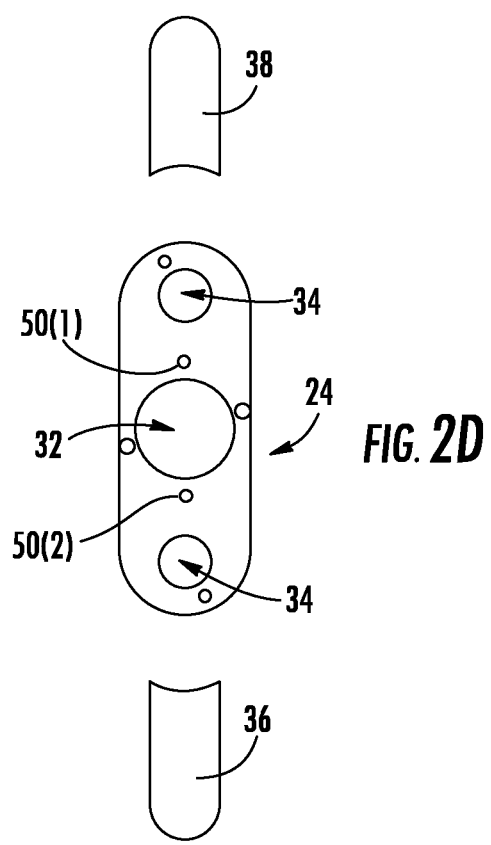

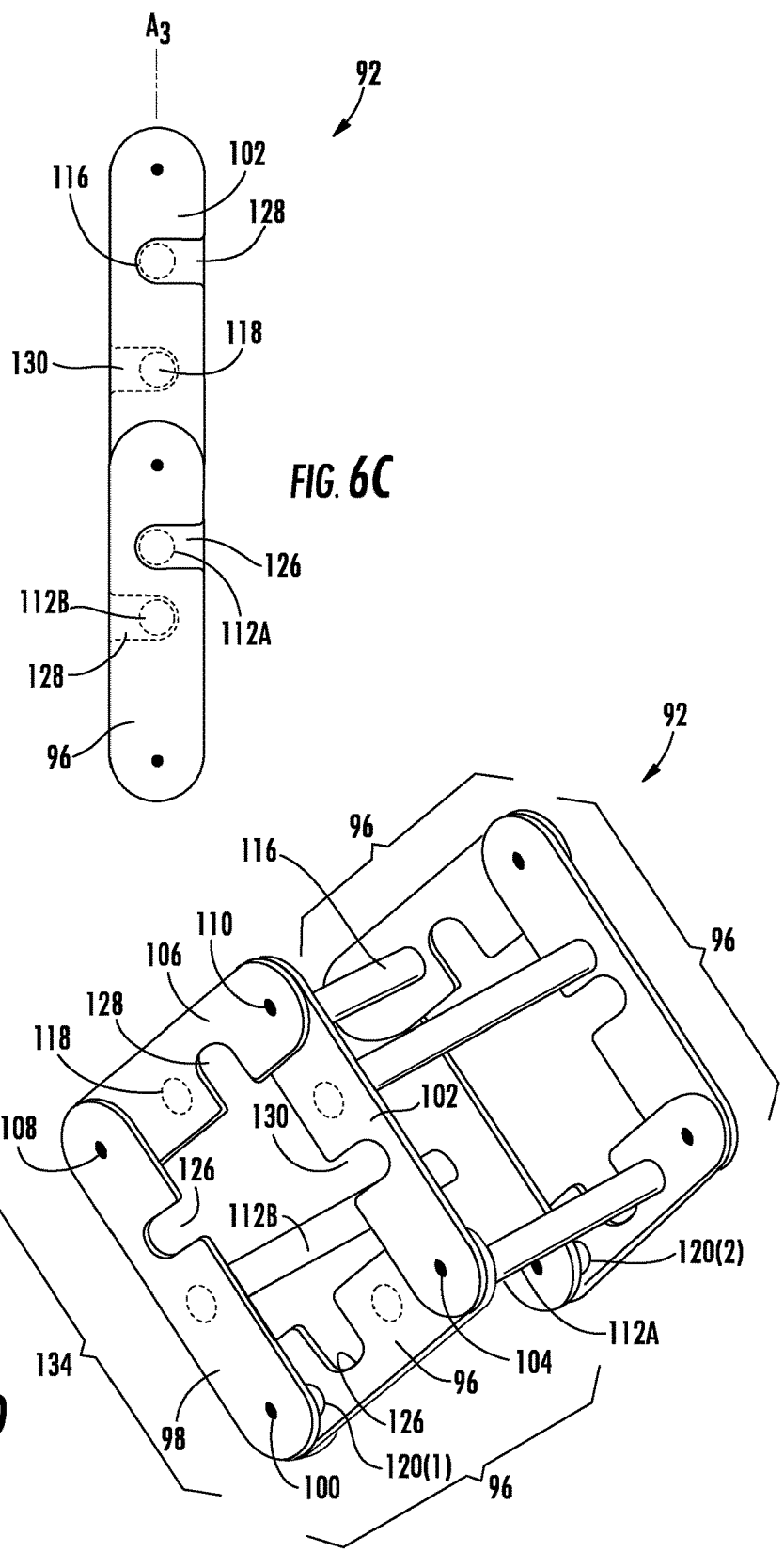

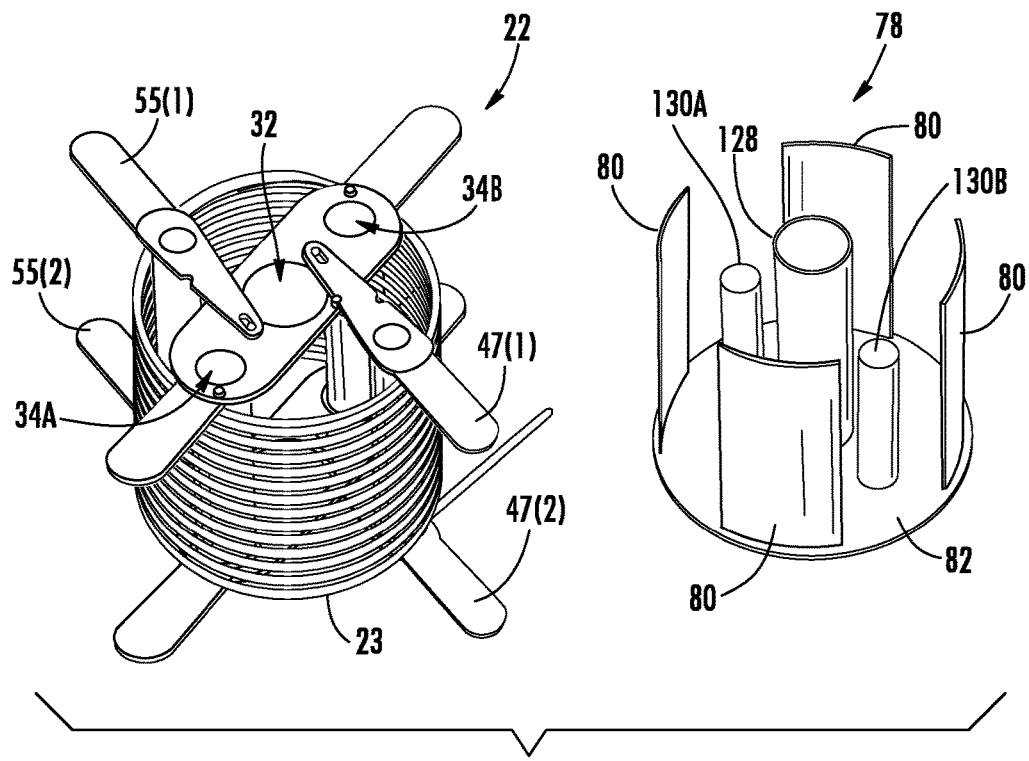
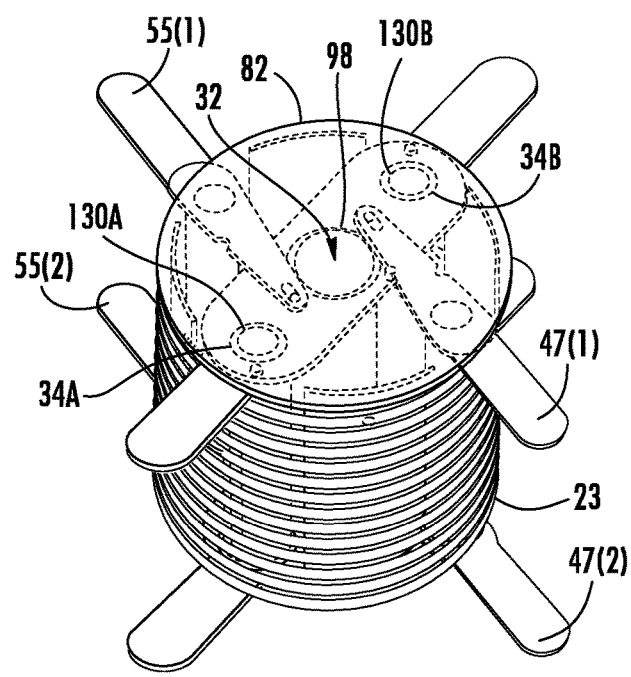
FIG. 8A
FIG. 8B

TRANSFORMABLE CABLE REELS AND RELATED ASSEMBLIES AND METHODS

RELATED APPLICATIONS

This application is a divisional of U.S. application Ser. No. 14/070,995, filed Nov. 4, 2013, which is a continuation of International Application No. PCT/US12/37082, filed May 9, 2012, which claims the benefit of priority to U.S. Provisional Application No. 61/485,909, filed May 13, 2011, the content of which is relied upon and incorporated herein by reference in their entirety.

BACKGROUND

Field of the Disclosure

The technology of the disclosure relates to a cable reels, and related assemblies and methods, which may be used to spool cable and pay out cable, including but not limited to fiber optic cable.

Technical Background

Benefits of optical fiber use include extremely wide bandwidth and low noise operation. Because of these advantages, optical fiber is increasingly being used for a variety of applications, including but not limited to broadband voice, video, and data transmission. As a result, fiber optic communications networks include a number of interconnection points at which multiple optical fibers are interconnected. Fiber optic communications networks also include a number of connection terminals, examples of which include, but are not limited to, network access point (NAP) enclosures, aerial closures, below grade closures, pedestals, optical network terminals (ONTs), and network interface devices (NIDs). In certain instances, the connection terminals include connector ports, typically opening through an external wall of the connection terminal. The connection terminals are used to establish optical connections between optical fibers terminated from the distribution cable and respective optical fibers of one or more "preconnectorized" drop cables, extended distribution cables, tether cables or branch cables, collectively referred to herein as "drop cables." The connection terminals are used to readily extend fiber optic communications services to a subscriber. In this regard, fiber optic networks are being developed that deliver "fiber-to-the-curb" (FTTC), "fiber-to-the-business" (FTTB), "fiber-to-the-home" (FTTH) and "fiber-to-the-premises" (FTTP), referred to generically as "FTTx."

As part of this extension to deliver services to subscribers is the last mile connection which often occurs indoors. Different kinds of buildings like multi-dwelling units and blocks of apartments require complicated cabling systems which might include many separated cables, each one connecting one subscriber. Installation of many cables which provide the connection between a main distribution point (which usually is located in the basement or in another place of the building) and the end user may cause many problems with routing through the wall or levels of the building. As a result, such cable installations consume undue time and cost.

To facilitate cable installations, the fiber optic cable is often provided on cable reels that can be used to provide, ship, and pay out fiber optic cable. For example, as shown in FIG. 1, an exemplary cable reel 10 is shown. Fiber optic cable 12 is spooled on the cable reel 10. The cable reel 10 is comprised of two flanges 14A, 14B disposed between a cable drum 16. The flanges 14A, 14B are separated a distance $D_1$ to provide the size of the cable drum 16, which in turn dictates how much fiber optic cable 12 length can be spooled onto the cable reel 10. The flanges 14A, 14B are raised about the surface of the cable drum 16 to retain fiber optic cable 12 spooled into the cable drum 16. An internal flange 18 may be disposed adjacent to the flange 14B to allow a portion of the fiber optic cable 12 to be started and stored separately in the area 20 between the internal flange 18 and the flange 14B before spooling. When the cable 12 needs to be accessed later, a technician may easy access the cable 12 in the area 20 without having to access the cable between the flange 14A and the internal flange. The fiber optic cable 12 can be dispensed from or "payed out" from the cable reel 10 when desired, such as during cable installations.

After the desired amount of the fiber optic cable 12 is payed out, excess of the fiber optic cable 12 may be retained on the cable reel 10. It is desired to store the excess fiber optic cable 12 not payed out after installation in case the excess fiber optic cable 12 is needed for additional cable installations or expansion of current cable installations. Also, because the excess fiber optic cable 12 is not conveniently stored on the cable reel 10 after payout, multiple cable reels having different lengths of fiber optic cable may deployed. This allows effective management (i.e., reduction) of the amount of excess cable that may remain after payout from a given cable reel 10, but also requires providing cable reels 10 with different lengths of cables which are standardized. In this instance, the cable reel 10 may be stored with the excess fiber optic cable 12 retained thereon. However, the cable reel 10 may not be suitable for storing excess fiber optic cable 12 at an installation site because of the significant volume that the cable reel 10 occupies. Thus, installation personnel may remove the excess fiber optic cable 12 from the cable reel 10 by removing the flanges 14A, 14B and/or 18 and storing the unspooled, loose excess fiber optic cable 12 at the installation site. Storing fiber optic cable 12 unspooled may cause the fiber optic cable 12 to become disorganized and difficult to reorganize and reuse or pay out during installation changes.

SUMMARY OF THE DETAILED DESCRIPTION

Embodiments disclosed in the detailed description include transformable cable reels, related assemblies and methods. The transformable cable reels may be employed for fiber optic cable or other types of cable, as non-limiting examples. The transformable cable reels disclosed herein may be provided or disposed in a first reel configuration for spooling on cable to the transformable cable reel and to pay out the spooled cable from the transformable cable reel, such as during cable installations. Cable may be spooled onto the transformable cable reel employing the assistance of external spooling devices and winding fixtures, if desired. Cable spooled on the transformable cable reel may then be payed out from the transformable cable reel. The transformable cable reel may also be configured in a second reel configuration that may be utilized to efficiently and neatly store any excess cable after payout of cable. As one non-limiting example, the volume of the cable reel may be less in the second reel configuration than in the first reel configuration so that less volume is required to store the transformable cable reel in after desired cable payout is performed. Providing the transformable cable reel in the second reel configuration may make it more feasible to store the transformable cable reel in fiber optic equipment, and/or avoid storing excess cable removed from a cable reel. Storing excess cable removed from a cable reel can cause the excess cable to become disorganized and more difficult to store, manage, and reuse. Avoiding removal of excess cable from a cable reel during storages may additionally save time and labor costs.

In one embodiment, a transformable cable reel is disclosed. The transformable cable reel may include a body aligned in a longitudinal direction and comprising at least one first traverse member including at least one first cable contact surface to form at least one first portion of a first reel configuration. The transformable cable reel may also include at least one first arm comprising a proximal end and a distal end, the proximal end of the at least one first arm pivotably attached to at least one first pivot disposed in the body, the at least one first arm further comprising a second traverse member disposed on the distal end of the at least one first arm, the second traverse member comprising a second cable contact surface to form a second portion of the first reel configuration. The transformable cable reel may also include at least one second arm comprising a proximal end and a distal end, the proximal end of the at least one second arm pivotably attached to at least one second pivot disposed in the body, the at least one second arm further comprising a third traverse member disposed on the distal end of the at least one first arm, the third traverse member comprising a third cable contact surface to form a third portion of the first reel configuration. The at least one first arm is configured to be rotated about the at least one first pivot and the at least one second arm is configured to be rotated about the at least one second pivot, to generally align the at least one first traverse member, the second traverse member, and the third traverse member along the longitudinal direction of the body in a second reel configuration.

In one non-limiting embodiment, a transformable cable reel is provided having a first reel configuration providing a first cable perimeter area to support a wound or spooled cable, the first reel configuration consuming a first volume. The transformable cable reel also comprises a second reel configuration consuming a second volume less than the first volume, the second reel configuration supporting the same length (e.g., same length with the same number of loops and/or turns) or substantially the same length (e.g., substantially same length with the same number of loops and/or turns) of spooled or would cable. In this regard, the transformable cable reel may have in profile a first geometric shape in the first reel configuration and in profile a second geometric shape in the second reel configuration. Using the above referenced example of a transformable cable reel, the at least one first arm is pivotably attached to the at least one first pivot disposed in the body, offset a distance $D_1$ from the center point of the body in the first reel configuration. In this manner, the distal end of the at least one first arm is located a distance $D_2$ from the center point of the body in the first reel configuration. Similarly, the at least one second arm is pivotably attached to the at least one second first pivot disposed in the body, also offset a distance $D_3$ from the center point of the body in the first reel configuration. In this manner, the distal end of the at least one second arm can also be located at the distance $D_2$ from the center point of the body (in this example, assuming the at least one first arm and the at least one second arm are the same length and pivotably attached to the body from the same offset from the center point of the body, in other words $D_1$ equals $D_3$, but such is not necessary).

When the at least one first arm and the at least one second arm are rotated about the at least one first pivot and at least one second pivot, respectively, in the second reel configuration, because the at least one first arm and the at least one second arm are pivotably attached to pivots disposed in the body offset from the center point of the body, the distal ends of the first arm and the at least one second arm will be disposed at a distance $D_4$ from the center point of the body in the second reel configuration. In this embodiment, the distance $D_4$ is greater than the distance $D_2$. In this manner, transformable cable reel can have a second volume in the second reel configuration less than the first volume in the first reel configuration, but retain the same cable perimeter surface area of the first configuration. The transformable cable reel can then support the same length of cable in both the first reel configuration to the second reel configuration.

In another embodiment, a transformable cable reel fixture is disclosed. The transformable cable reel fixture may include a fixture base comprising a base surface. The transformable cable reel fixture may also include a center cantilever attached to a center portion of the base surface and extending orthogonally from the base surface about a center axis of the fixture base. The transformable cable reel may also include at least three flexible arcuate cantilevers disposed in a circumferential arrangement on the fixture base, the at least three flexible arcuate cantilevers each comprising a cable mounting surface configured to form a portion of a reel configuration of a cable reel.

In another embodiment, a method of operating a transformable cable reel is disclosed. The method of operating a transformable cable reel includes providing a transformable cable reel comprising a body comprising at least one traverse member providing at least one first cable contact surface to form at least one first portion of a first reel configuration, and a second and third traverse members disposed on at least one first arm and at least one second arm, respectively, the at least one first arm and the at least one second arm pivotably attached to the body, the second and third traverse members providing a second cable contact surface and a third cable contact surface, respectively, to form a second portion and third portion of the first reel configuration. This method also includes disposing the at least one first arm at a first angle relative to the body and disposing the at least one second arm at a second angle relative to the body, to dispose the second and the third traverse members, respectively, in a first reel configuration. This method also includes spooling cable onto the at least one first cable contact surface, the second cable contact surface, and the third cable contact surface in the first reel configuration.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 2D is a perspective view illustrating the body of the transformable cable reel of FIG. 2A detached from first and second breakaway flanges;

FIG. 5I is a perspective view illustrating an alternative embodiment of the transformable cable reel in FIG. 2A depicting exemplary locking mechanisms for the first and second arms;

FIG. 6C is a side view illustrating the alternative embodiment of FIG. 6A in a second reel configuration;

FIG. 6D is a perspective view illustrating the alternative embodiment of FIG. 6A in a first reel configuration;

FIG. 8A is a perspective view illustrating the exemplary transformable cable reel in FIG. 2A in the first reel configuration wound or spooled with fiber optic cable and the winding fixture disposed nearby;

FIG. 8B is a perspective view illustrating the exemplary transformable cable reel in FIG. 2A in the first reel configuration wound or spooled with fiber optic cable and the winding fixture installed;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include transformable cable reels, related assemblies and methods. The transformable cable reels may be employed for fiber optic cable or other types of cable. The transformable cable reels may be provided or disposed in a first reel configuration for spooling on cable to the transformable cable reel and to pay out the spooled cable from the transformable cable reel, such as during cable installations. Cable may be spooled onto the transformable cable reel employing the assistance of external spooling devices and winding fixtures, if desired. Cable spooled on the transformable cable reel may then be payed out from the transformable cable reel. In embodiments disclosed herein, the transformable cable reel may also be configured in a second reel configuration that may be utilized to efficiently and neatly store any excess cable after payout of cable. As one non-limiting example, the volume of the cable reel may be less in the second reel configuration than in the first reel configuration so that less volume is required to store the transformable cable reel in after desired cable payout is performed. Providing the transformable cable reel in the second reel configuration may make it more feasible to store the transformable cable reel in fiber optic equipment, and/or avoid storing excess cable removed from a cable reel. Storing excess cable removed from a cable reel can cause the excess cable to become disorganized and more difficult to store, manage, and reuse. Avoiding removal of excess cable from a cable reel during storage may additionally save time and labor costs.

Figure 2A:
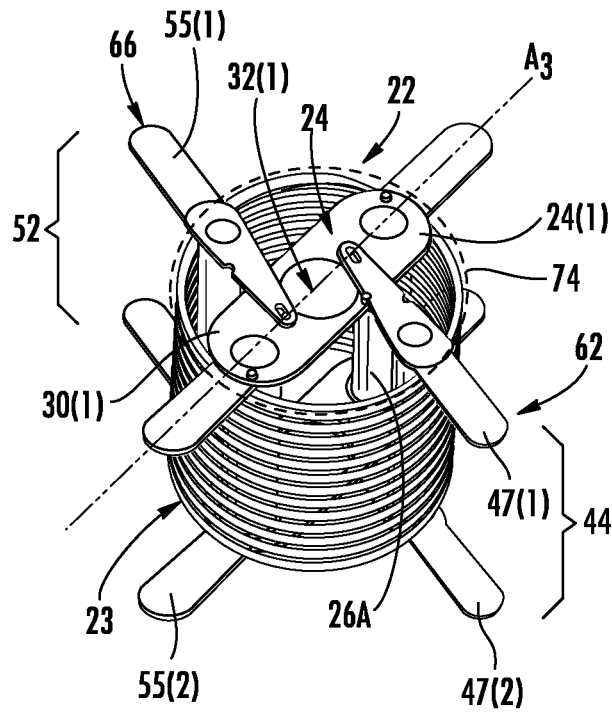
FIG. 2A is a perspective view illustrating an exemplary transformable cable reel in a first reel configuration with a cable wound or spooled about a plurality of traverse members.
Figure 2C:
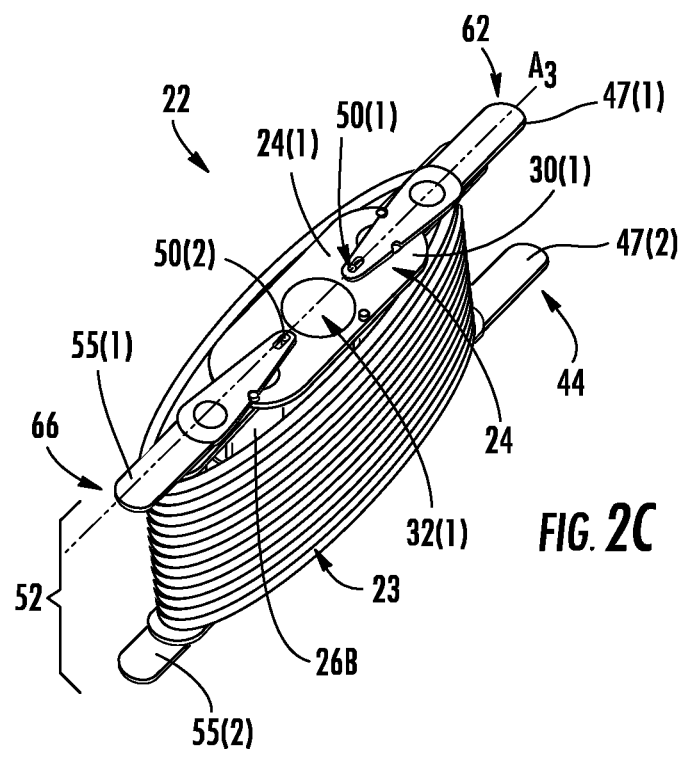
FIG. 2C is a perspective view illustrating the transformable cable reel of FIG. 2A in a second reel configuration with the cable wound or spooled about the plurality of traverse members.
Figure 2B:
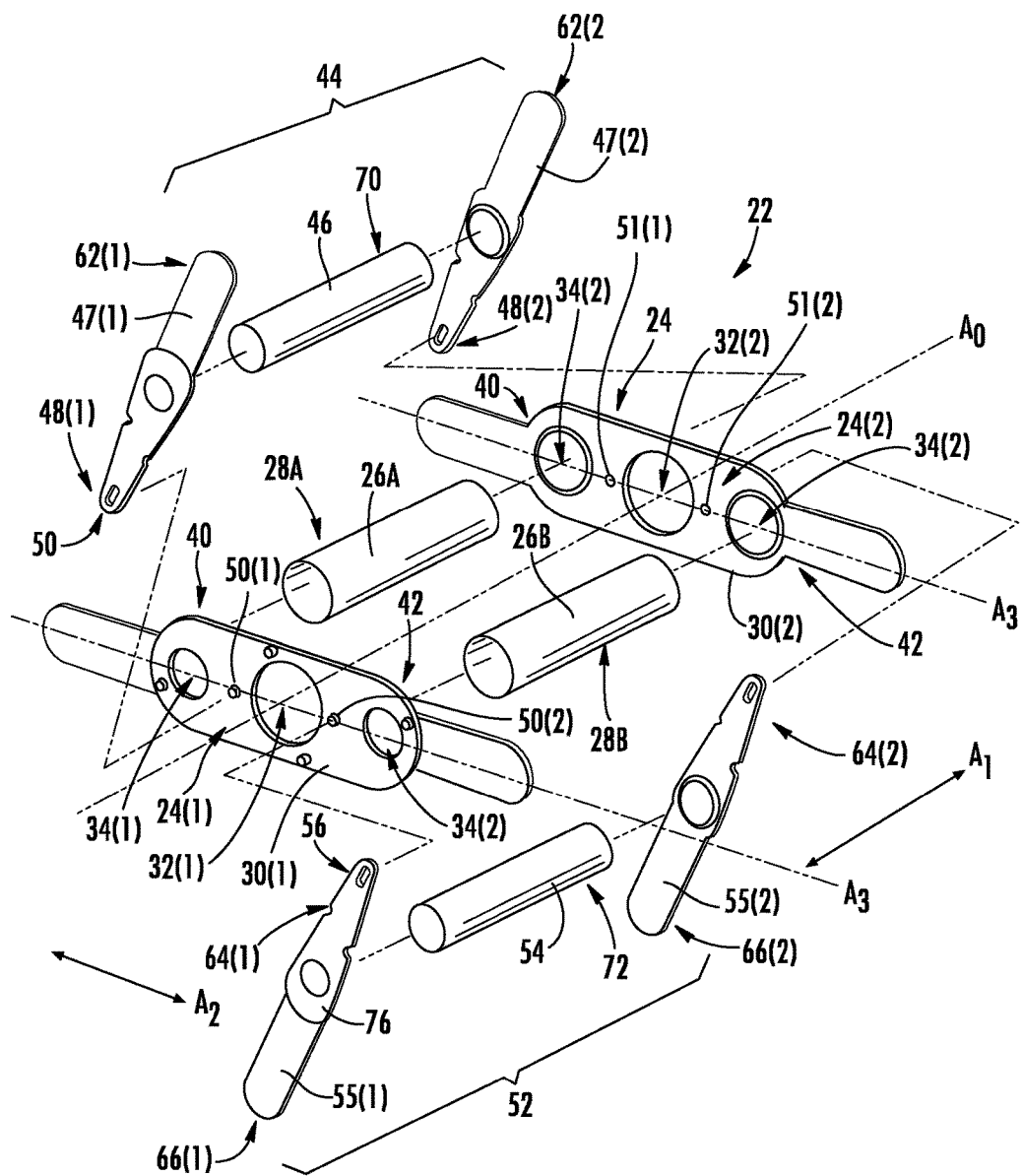
FIG. 2B is an exploded perspective view of the transformable cable reel of FIG. 2A.

In this regard, FIGS. 2A and 2B illustrate a schematic diagram and an exploded view of one embodiment of a transformable cable reel 22. FIG. 2A illustrates the transformable cable reel 22 in a first reel configuration, which may be used for spooling cable 23 onto the transformable cable reel 22 and for cable payout. The cable 23 may be fiber optic cable or any other type of cable. FIG. 2B illustrates the transformable cable reel 22 in a second reel configuration, which may be used for storage of excess cable. As can be seen from FIGS. 2A and 2B, in this embodiment, the volume of the transformable cable reel 22 in the first reel configuration in FIG. 2A is greater than the volume of the transformable cable reel 22 in the second reel configuration in FIG. 2B. Providing the transformable cable reel 22 in the second reel configuration in FIG. 2B may allow for storage of the transformable cable reel 22 in fiber optic equipment after cable installation for storing excess cable without removing the excess cable 23 from the transformable cable reel 22. Further, the transformable cable reel 22 in the second reel configuration in FIG. 2B can be transformed back into the first reel configuration for convenient additional payout of cable if desired.

With continuing references to FIGS. 2A and 2B and the exploded view of the transformable cable reel 22 in FIG. 2C, the transformable cable reel 22 in this embodiment may include a body 24. One or more first traverse members 26 may be disposed in the body 24. In this embodiment, two first traverse members 26A, 26B may be provided in the body 24. Each traverse member 26A, 26B provides a first cable contact surface 28A, 28B to allow the cable 23 to be disposed thereon for winding or spooling on the transformable cable reel 22 in the first reel configuration, as will be discussed in more detail below.

In this embodiment, the body 24 forms the structural core of the transformable cable reel 22. Thus, the body 24 may be made of any strong rigid material, for example, metal or plastic, as non-limiting examples. The body 24 may have planar surfaces, for example a flange 30, in a longitudinal direction $A_2$ along a longitudinal axis $A_3$ and may include orifices or other connective interfaces that may support the connection of other components of the transformable cable reel 22. Further, an axis of rotation $A_0$ of the transformable cable reel 22 may be concentric with a center orifice 32 which may be also concentric with the geometric center of the body 24. For example, the center orifice 32 may be disposed at the axis of rotation $A_0$ to support the insertion of an axial or center mount for the winding and unwinding of cable 23. The bodies 24(1), 24(2) may each also include one or more secondary orifices 34(1), 34(2) to allow for other devices, for example, fixtures to be attached to the transformable cable reel 22, as will be discussed below in more detail. The body 24 may also include first and second breakaway flanges 36, 38 as shown in FIG. 2B attached to the first and second ends 40, 42 of the body 24 and disposed in the longitudinal direction $A_2$ along a longitudinal axis $A_3$.

With continuing reference to FIGS. 2A-2C, the transformable cable reel 22 also includes a first frame 44 and a second frame 52. The first frame 44 is this embodiment is comprised of a second traverse member 46 disposed between a first arm 47(1) and a second arm 47(2). The second traverse member 46 is attached at proximal ends 48(1), 48(2) of the first arm 47(1) and second arm 47(2), respectively, which are pivotably attached to first pivots 50(1), 51(1), respectively, located at a first end 40 of the body 24. The second frame 52 is this embodiment is comprised of a third traverse member 54 disposed between a third arm 55(1) and a fourth arm 55(2). The third traverse member 54 is attached at the proximal ends 64(1), 64(2) of the third arm 55(1) and a fourth arm 55(2), respectively, which are pivotably attached to second pivots 50(2), 51(2), respectively, located at a second end 42 of the body 24. The second and third traverse members 46, 54 provide additional cable contact surfaces 70, 72 (also discussed below in more detail) to allow the cable 23 to be disposed thereon for winding or spooling on the transformable cable reel 22 in both the first and second reel configurations, as will be discussed in more detail below. Also, as will be discussed in more detail below, by the first and second arms 47(1), 47(2) and the third and fourth arms 55(1), 55(2) being pivotable about the body 24, the first and second arms 47(1), 47(2) and the third and fourth arms 55(1), 55(2) can be rotated, as illustrated in FIG. 2B, to align, rotate, move the first and second arms 47(1), 47(2) and the third and fourth arms 55(1), 55(2) towards or about the traverse members 26A, 26B of the body 24, respectively, to provide the transformable cable reel 22 in the second reel configuration.

A complementary body 24(2) may be attached to an opposite side of the one or more first transverse members 26 from the body 24(1) and may provide additional strength to the transformable cable reel 22. The second arm 47(2) may be attached to the second transverse member 46 and may be pivotably attached to the complementary body 24(2). Further, the fourth arm 55(2) may be attached to a third traverse member 54 and may be pivotably connected to the complementary body 24(2). The complementary first and second arms 47(1), 47(2) together with the third and fourth arms 55(1), 55(2) prevent a width of the cable 23 built up around the first, second, and third traverse members 26, 46, 54 to be retained in the transformable cable reel 22. Also, one way to permit a longer cable 23 to be spooled and retained on the transformable cable reel 22 may be to increase the length of the first and second arms 47(1), 47(2) and the third and fourth arms 55(1), 55(2) and to increase the length of the first, second and third traverse members 26A, 26B, 46, 54.

The first and second arms 47(1), 47(2) and the third and fourth arms 55(1), 55(2) comprise the main movable components of the transformable cable reel 22. The second and third traverse members 46, 54 may include planar or curvilinear surfaces and members that are suitable to transfer and resist torque moments created as a result of spooling the cable 23 onto the transformable cable reel 22 and spooling the cable 23 from the transformable cable reel 22. In this regard, the first and second arms 47(1), 47(2) may each comprise proximal ends 48(1), 48(2), distal ends 62(1), 62(2), with the second traverse member 46 disposed therebetween. The first and second arms 47(1), 47(2) are designed to allow technician to apply a force thereto to cause the first and second arms 47(1), 47(2) to pivot the second transverse member 46 about a first pivots 50(1), 51(1) connected at the proximal ends 48(1), 48(2). Correspondingly, the third and fourth arms 55(1), 55(2) may comprise proximal ends 64(1), 64(2) and distal ends 66(1), 66(2), wherein the third traverse member 54 is disposed therebetween The first, second, third, and fourth arms 47(1), 47(2), 55(1), 55(2) may be made of any strong rigid material, for example, metal or plastic.

The one or more first traverse members 26A, 26B connected to the body 24 can be similar in structure to the second and third traverse members 46, 54. The first, second and third traverse members 26A, 26B, 46, 54, may be long with a relatively narrow width and include a curvilinear surface to contact the cable 23. The first, second and third traverse members 26A, 26B, 46, 54 may have for example, a circular cylinder shape or a crescent cylinder shape and are disposed generally in a traverse direction $A_1$ to the body 24.

The transformable cable reel 22 is described directionally in terms of a traverse direction $A_1$ and a longitudinal direction $A_2$ perpendicular to the traverse direction $A_1$. The transverse direction $A_1$ establishes the direction by which first, second and third traverse members 26A, 26B, 46, 54, are orientated in order to support the cable in the form of a geometric circular cylinder upon the transformable cable reel 22. The longitudinal direction $A_2$ is the direction that the body 24 may be aligned from the first end 40 of the body 24 to the second end 42 of the body 24.

The transformable cable reel 22 performs its functions in either a first or second reel configuration. A first reel configuration shown in FIG. 2A is used when cable 23 is to be wound or spooled onto the transformable cable reel 22 in preparation for delivery to an installation site and later when the cable 23 is "payed out" (dispensed) at an installation location. A second reel configuration shown in FIG. 2B is used when a portion of the cable 23 needed at the installation site has been payed out and excess cable 23 remains on the transformable cable reel 22 and needs to be stored.

When the transformable cable reel 22 is in the first reel configuration, the first, second and third traverse members 26A, 26B, 46, 54, have first, second, and third cable contact surfaces 28A, 28B, 70, 72, respectively, are orientated tangentially to a geometric circular cylinder 74 with an axis 76 in the traverse direction $A_1$. In this first reel configuration, the transformable cable reel 22 may spool cable 23 upon the geometric circular cylinder 74 approximated by the first, second, and third cable contact surfaces 28A, 28B, 70, 72. The cable 23 may be safely and smoothly wound or spooled and payed out when the transformable cable reel 22 may be in a first reel configuration, because the cable 23 will rotate at a more constant rate when formed upon a surface cylinder concentric to the axis of rotation $A_0$.

The second reel configuration of the transformable cable reel 22 is depicted in FIG. 2C. In this configuration, the first and second arms 47(1), 47(2) may have pivoted about the first pivots 50(1), 51(1), and the third and fourth arms 55(1), 55(2) may have pivoted about the second pivots 50(2), 51(2) to thereby align the first and second arms 47(1), 47(2) and the third and fourth arms 55(1), 55(2) with the body 24. The first and second arms 47(1), 47(2) and the third and fourth arms 55(1), 55(2) may be pivoted to the second reel configuration after the cable 23 is payed out from the transformable cable reel 22. The transformable cable reel 22 of the second configuration is longer in a longitudinal direction than that of the first configuration, but occupies less volume and is thereby more efficient to store.

Volume is compared between the first and second reel configurations based the length of each loop of the cable 23 wound or spooled about the transformable cable reel 22 remains constant or substantially constant in the conversion of the transformable cable reel 22 between the first and second reel configurations. If the volume of the transformable cable reel 22 is approximated as a circular cylinder in the first reel configuration and that of an elliptic cylinder (similar to an oblong cylinder for purposes of volumetric comparison) in the second reel configuration, then the volume in the second reel configuration case would be smaller. This is because an elliptic cylinder has a smaller volume than a circular cylinder when the perimeter of their cross sections are equivalent.

Figure 2E:
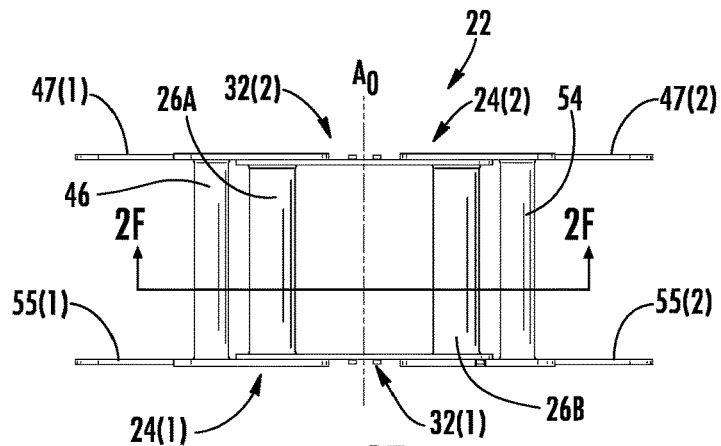
FIG. 2E is a top view of the transformable cable reel of FIG. 2A in the second reel configuration.
Figure 2F:
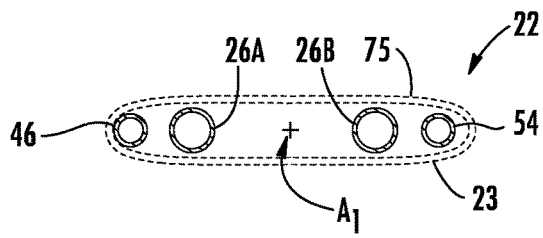
FIG. 2F is a side view of the transformable cable reel of FIG. 2A in the second reel configuration.

The geometric circular cylinder 74 explains the shape and orientation of the surfaces which contact the cable 23 in the first reel configuration and the shape assumed by the cable 23 in this first reel configuration. The geometric circular cylinder with its axis 76 coincident with the axis of rotation $A_0$ of the transformable cable reel 22 is the "drum" of the first reel configuration whose portions are formed by surfaces of the transformable cable reel 22 that are tangentially oriented and coincident to the geometric circular cylinder 74. Similarly, as depicted in FIGS. 2C, 2E, 2F, a geometric oblong cylinder 75 approximates the shape and orientation of the surfaces that contact the cable 23 in the second reel configuration and the shape assumed by the cable 23 in the second reel configuration.

As discussed above, the transformable cable reel 22 may be converted between the first and second reel configurations shown in FIGS. 2A and 2B. There are two exemplary approaches for transitioning between the two reel configurations and they involve applying forces to the distal ends 62(1), 62(2), 66(1), 66(2) to pivot the first and second arms 47(1), 47(2) and the third and fourth arms 55(1), 55(2), respectively with respect to the body 24 discussed below. It is also noted that when the first and second arms 47(1), 47(2) and the third and fourth arms 55(1), 55(2) are pivoted such the ends 40, 42 of the body 24 may be an obstacle and thereby may be removed or shortened in length as depicted in FIG. 2D. Other embodiments of the transformable cable reel 22 may be configured to have the first and second breakaway flanges 36, 38 move and not fully breakaway so they will not be misplaced by a technician.

Figure 3A:
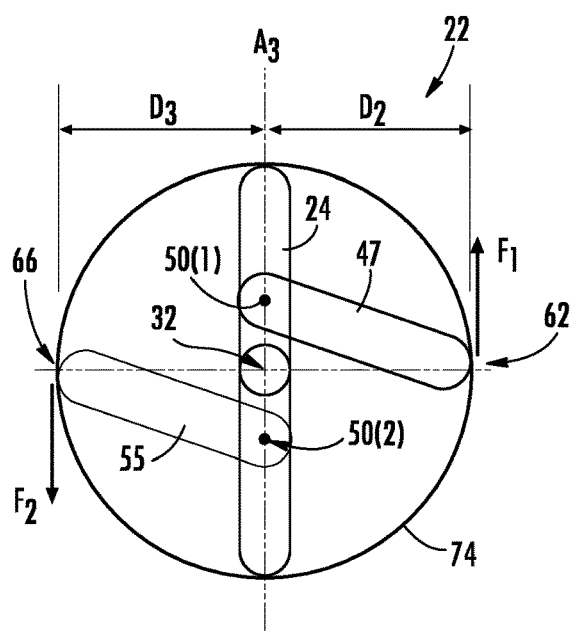
FIG. 3A is a conceptual side view in a traverse direction depicting individual rotating forces being applied to a first arm and a second arm of an exemplary transformable cable reel configured to be provided in the first reel configuration of FIG. 2A and a second reel configuration of FIG. 2C.
Figure 3B:
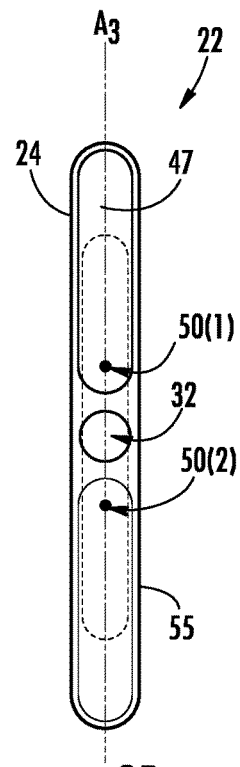
FIG. 3B is a conceptual side view of the transformable cable reel of FIG. 3A transformed into the second reel configuration by the individual rotating forces.

One approach to transform the transformable cable reel 22 from the first reel configuration to the second reel configuration is to apply a first force $F_1$ and a second force $F_2$ to each of the distal ends 62(1), 62(2), 66(1), 66(2) of the first and second arms 47(1), 47(2) and the third and fourth arms 55(1), 55(2), respectively, as shown in FIG. 3A. The first and second rotating forces $F_1$, $F_2$ may remain parallel to the longitudinal axis $A_3$ of the body 24 during the conversion from the first reel configuration to the second reel configuration. The first and second rotating forces $F_1$, $F_2$ are displaced distances $D_2$, $D_3$ respectively as illustrated in FIG. 3A, thus the torque moments $F_1*D_2$ and $F_2*D_3$ are applied to the first and second arms 47(1), 47(2) and the third and fourth arms 55(1), 55(2) about the first pivots 50(1), 51(1) and second pivots 50(2), 51(2), respectively, during the transition between the first and second reel configurations. The first and second rotating forces $F_1$, $F_2$ cause the first and second arms 47(1), 47(2) and the third and fourth arms 55(1), 55(2) to rotate and pivot about the first pivots 50(1), 51(1) and the second pivots 50(2), 51(2), respectively, until the first and second arms 47(1), 47(2) and the third and fourth arms 55(1), 55(2) align themselves along a longitudinal axis $A_3$ of the body 24 as shown in FIG. 3B. When the first and second arms 47(1), 47(2) and the third and fourth arms 55(1), 55(2) are in these aligned positions, then the transformable cable reel 22 has been converted into the second reel configuration and there will be no additional torque moments applied to the first and second arms 47(1), 47(2) and the third and fourth arms 55(1), 55(2), because $D_2$ and $D_3$ are zero.

Figure 4A:
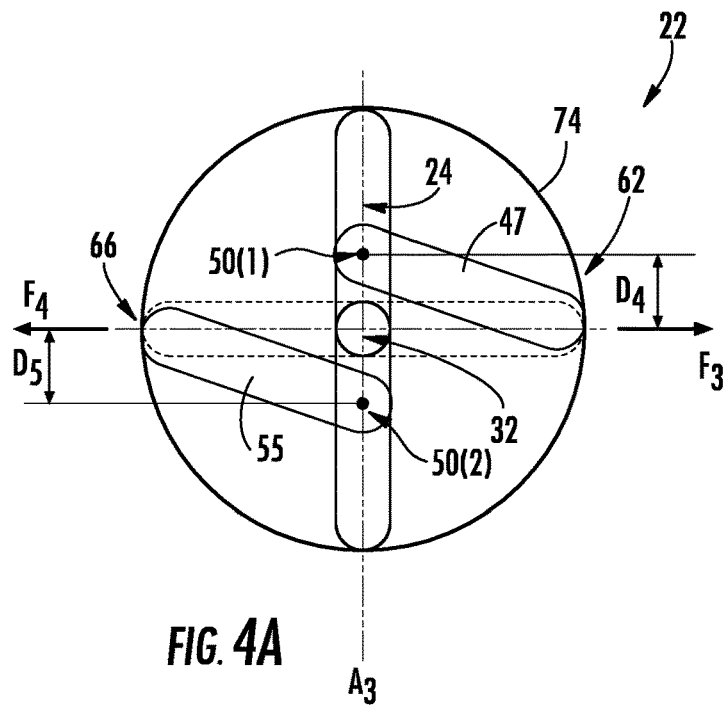
FIG. 4A is a conceptual side view in a traverse direction depicting opposite tensile forces being applied to the first arm and second arm of the exemplary transformable cable reel in the first reel configuration to provide the transformable cable reel in the second reel configuration.
Figure 4B:
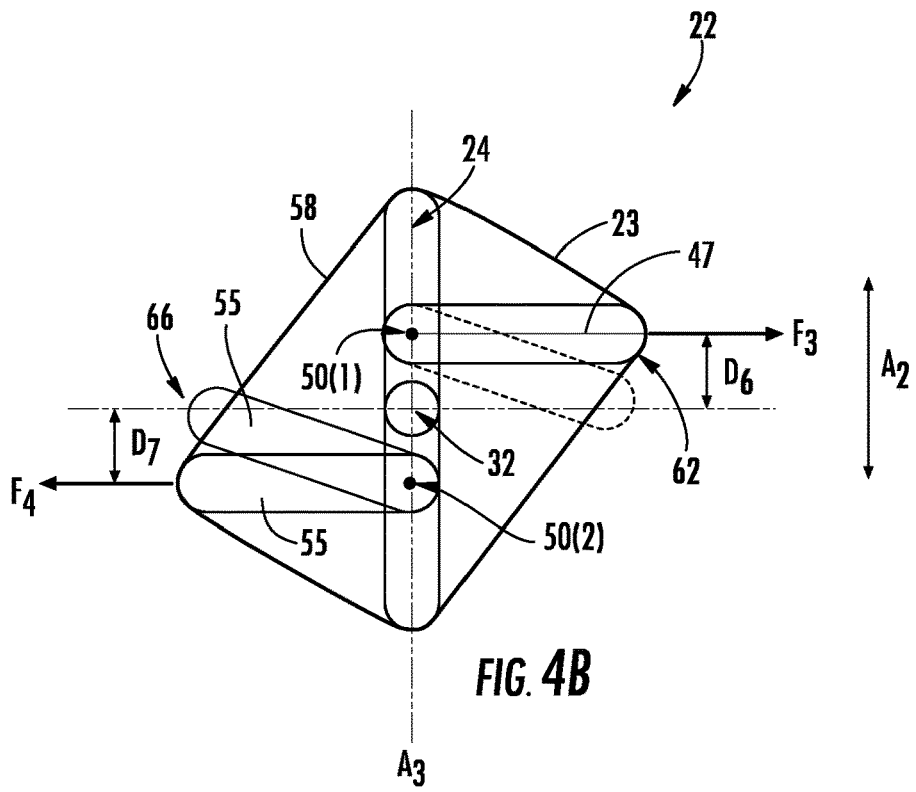
FIG. 4B is a conceptual side view of the transformable cable reel of FIG. 4A depicting the moment upon the body created by the opposite tensile forces after the arms have aligned with the opposite tensile forces.
Figure 4C:
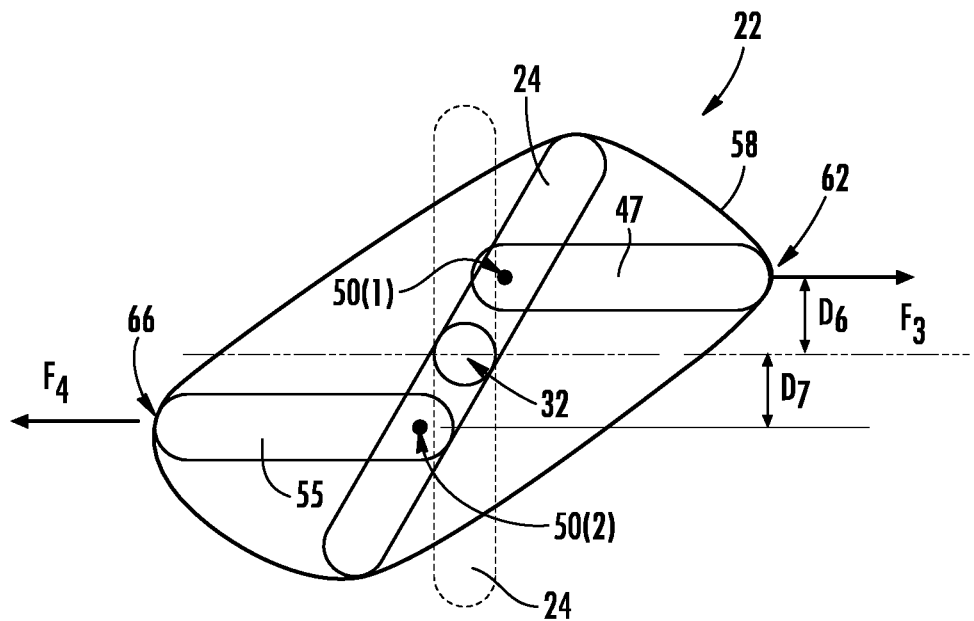
FIG. 4C is a conceptual side view of the transformable cable reel of FIG. 4A and the fiber optic cable stored thereon depicting the moment upon the body created by the opposite tensile forces after the first and second arms have been aligned with the opposite tensile forces and the body has begun to rotate.
Figure 4D:
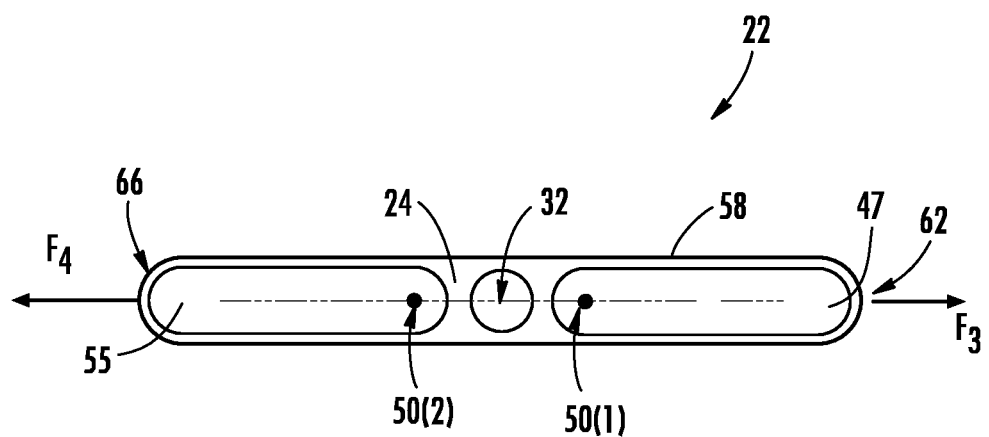
FIG. 4D is a conceptual side view of the transformable cable reel of FIG. 4A in the second reel configuration created by the opposite tensile forces.

A second approach to transition from the first reel configuration to the second reel configuration is depicted in FIG. 4A. In this approach, first and second opposite forces $F_3$, $F_4$ are applied to the distal ends 62(1), 62(2), 66(1), 66(2) of the first and second arms 47(1), 47(2) and the third and fourth arms 55(1), 55(2), respectively. The first and second opposite forces $F_3$, $F_4$ may be equal to each other and perpendicular to both the traverse and longitudinal directions $A_1$, $A_2$. As depicted in FIGS. 4A-4D the transformable cable reel 22 may initially respond to the moments $F_3*D_4$, $F_4*D_5$ created by the first and second opposite forces $F_3$, $F_4$ by having the first and second arms 47(1), 47(2) and the third and fourth arms 55(1), 55(2) pivot about the first pivots 50(1), 51(1) and the second pivots 50(2), 51(2), respectively. The result is depicted in FIG. 4B, where the first and second arms 47(1), 47(2) and the third and fourth arms 55(1), 55(2) rotate about the first pivots 50(1), 51(1) and the second pivots 50(2), 51(2), respectively, to align themselves along the first and second opposite forces $F_3$, $F_4$ and the body 24 remains stationary. Next, the transformable cable reel 22 is subject to the moments $F_3*D_6$, $F_4*D_7$ created by the first and second opposite forces $F_3$, $F_4$. The distances $D_6$, $D_7$ being the respective distances between the first pivots 50(1), 51(1) and the second pivots 50(2), 51(2) and the axis or rotation of the body 24. Next, as depicted in FIG. 4C, the body 24 pivots to align itself with the first and second opposite forces $F_3$, $F_4$ as shown in FIG. 4C under the influence of the moments $F_3*D_6$, $F_4*D_7$ discussed above. FIG. 4C depicts the change in the cable 23 shape as the body 24 begins to rotate. When the body 24 aligns itself with the first and second arms 47(1), 47(2) and the third and fourth arms 55(1), 55(2), as well as the first and second opposite forces $F_3$, $F_4$ then the second reel configuration may be created as depicted in FIG. 4D and is functionally equivalent to FIG. 3B.

Figure 5A:
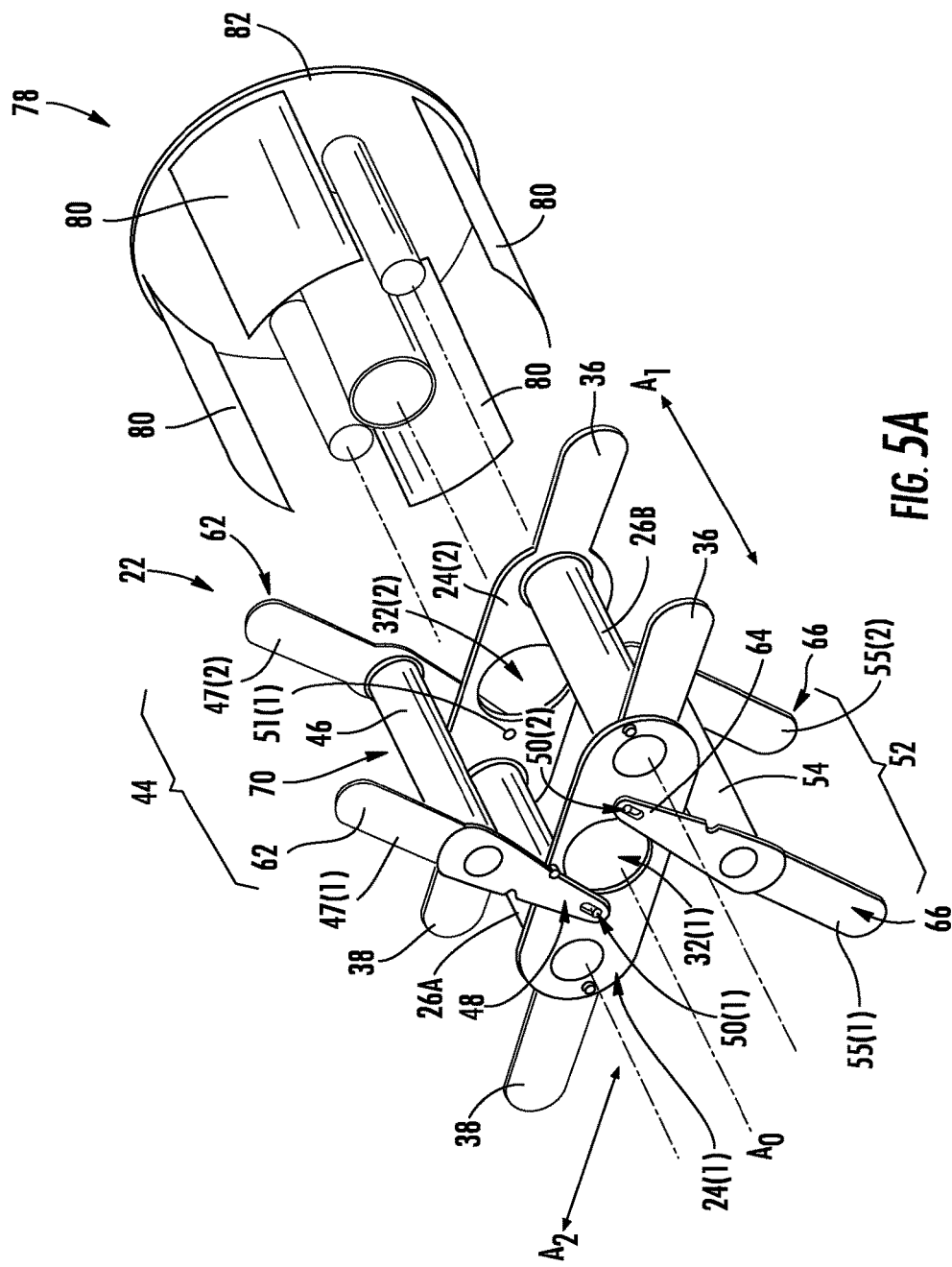
FIG. 5A is a perspective view illustrating the exemplary transformable cable reel in FIG. 2A in the first reel configuration and disposed adjacent to a winding fixture.
Figure 5B:
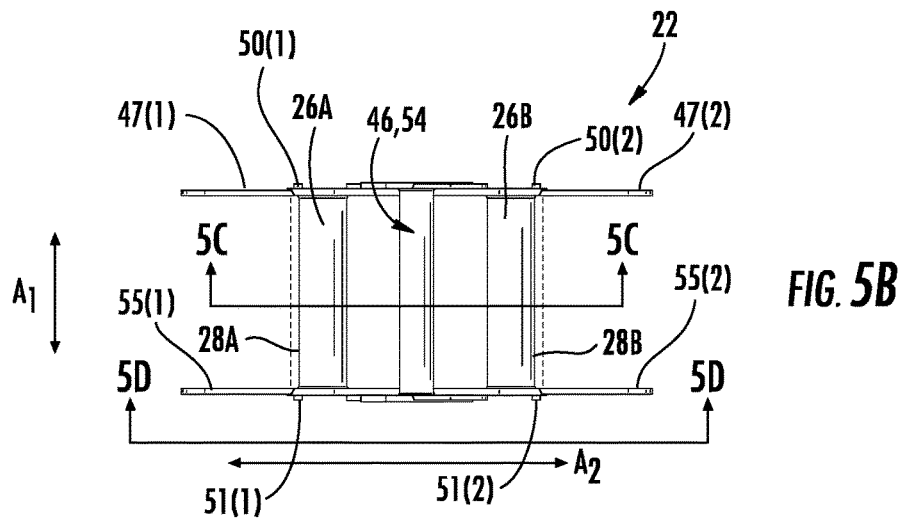
FIG. 5B is a top view in the traverse direction illustrating the exemplary transformable cable reel in FIG. 2A in the first reel configuration.
Figure 5C:
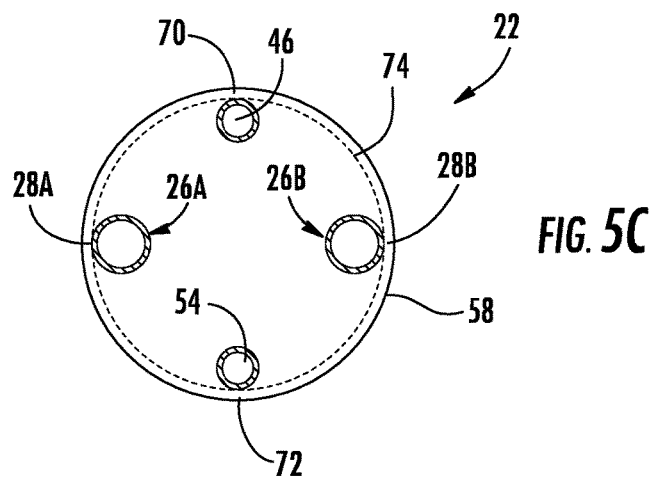
FIG. 5C is a side view of the exemplary transformable cable reel in FIG. 2A.

In continuation of the previous discussion regarding additional detail on individual components of the transformable cable reel 22, FIG. 5A is provided. FIG. 5A depicts that the transformable cable reel 22 may include the body 24, the first and second arms 47(1), 47(2), and the third and fourth arms 55(1), 55(2). The body 24 may be aligned in a longitudinal direction $A_2$ and comprise at least one first traverse member 26A, 26B. As shown in FIGS. 5B and 5C, the at least one traverse member 26A, 26B may include at least one first cable contact surface 28 to thereby define at least one first portion of the geometric circular cylinder 74 that makes up the first reel configuration.

While in the first reel configuration, a winding fixture 78 may be attached to the transformable cable reel 22. The winding fixture 78 performs several features when cable 23 is wound or spooled onto the transformable cable reel 22. First, the winding fixture 78 may transfer rotating torque from a motor (not shown) to turn the transformable cable reel 22 in order for the cable 23 to be wound or spooled upon it. Further, the winding fixture 78 provides additional support for the cable 23 between the first, second and third traverse members 26A, 26B, 46, 54 so that the cable 23 will have a surface most similar to the geometric circular cylinder 74 to wind upon.

In this regard, FIG. 5A depicts a non-limiting embodiment of a winding fixture 78 aligned to be attached to a transformable cable reel 22 in the first reel configuration. The winding fixture 78 may be attached to the transformable cable reel 22 to form a more complete contact surface approximating the geometric circular cylinder 74. This may allow the cable 23 to be wound or spooled onto the transformable cable reel 24 in the first reel configuration in a geometric circular cylinder manner as opposed to the cable 23 being wound or spooled in a geometric rectangular or square. The winding fixture 78 may be employed during the spooling of cable on the transformable cable reel 22, and then removed after spooling and/or before payout of the cable 23. In this regard, the winding fixture 78 may include a plurality of curved arcuate cantilevers 80 attached to a base 82. The plurality of curved arcuate cantilevers 80 are positioned between the first, second, and third cable contact surfaces 46, 70, 72 to provide more contiguous support for the cable 23 between these surfaces so that a more complete circular spiral may be formed during winding to better approximate a geometric circular cylinder 74. The winding fixture 78 may be detached from the transformable cable reel 22 by pulling the base 82 once the cable 23 is wound or spooled upon the transformable cable reel 22.

Figures 5D, 5E:
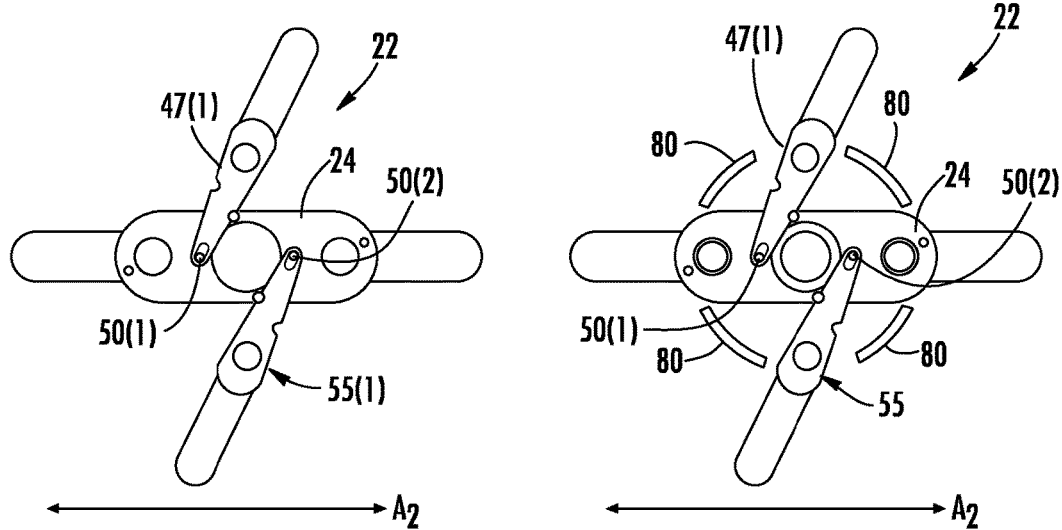
FIG. 5D is a side view in the traverse direction illustrating the exemplary transformable cable reel in FIG. 2A in the first reel configuration without the winding fixture attached to the transformable cable reel.
FIG. 5E is a side view in the traverse direction illustrating the exemplary transformable cable reel in FIG. 2A in the first reel configuration with the winding fixture attached to the transformable cable reel.

FIG. 5D depicts a side view in the transverse direction of a transformable cable reel 22 without the winding fixture 78 attached. There are open spaces between the first and second arms 47(1), 47(2) and the third and fourth arms 55(1), 55(2) and the body 24. When the winding fixture 78 is attached, these spaces are occupied by the plurality of arcuate cantilevers 80 of the winding fixture 78 as illustrated in FIG. 5E. When those spaces are occupied, the geometric circular cylinder 74 is better realized to support the cable 23 in the first reel configuration upon spooling and/or winding of the cable 23 onto the transformable cable reel 22.

In other words, the geometric circular cylinder 74 upon which the cable 23 is wound or spooled in FIG. 5C is only defined by the first, second and third cable contact surfaces 28A, 28B, 70, 72 (i.e., four cable contact surfaces) and thus the cable 23 may flatten between cable contact surfaces 28A, 28B, 70, 72 instead of forming a complete geometric circular cylinder 74. Thus, the plurality of arcuate cantilevers 80 support the cable 23 between the cable contact surfaces 28, 70, 72 to form a more complete cross section of the geometric circular cylinder 74 free from flat portions. Flat portions may be problematic because they reduce the capacity of the transformable cable reel 22, to store cable 23 by reducing the length of the cable loops. They may provide unsteadiness to winding and paying out the cable 23. They also can inhibit the transformable cable reel 22 from converting from a first reel configuration to a second reel configuration.

Figure 5F:
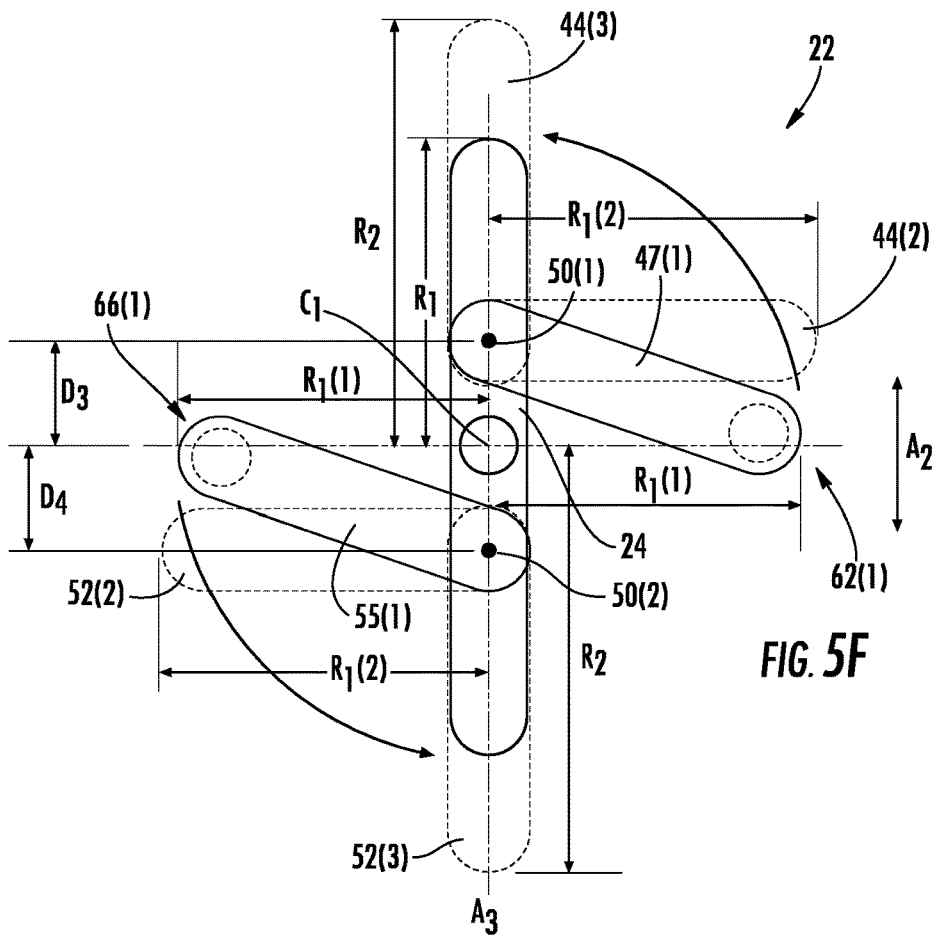
FIG. 5F is a conceptual side view in the traverse direction of the exemplary transformable cable reel in FIG. 2A in the first reel configuration depicting the effective radii of the first and second arms from the center of the body in both the storage and first reel configurations.
Figure 5G:
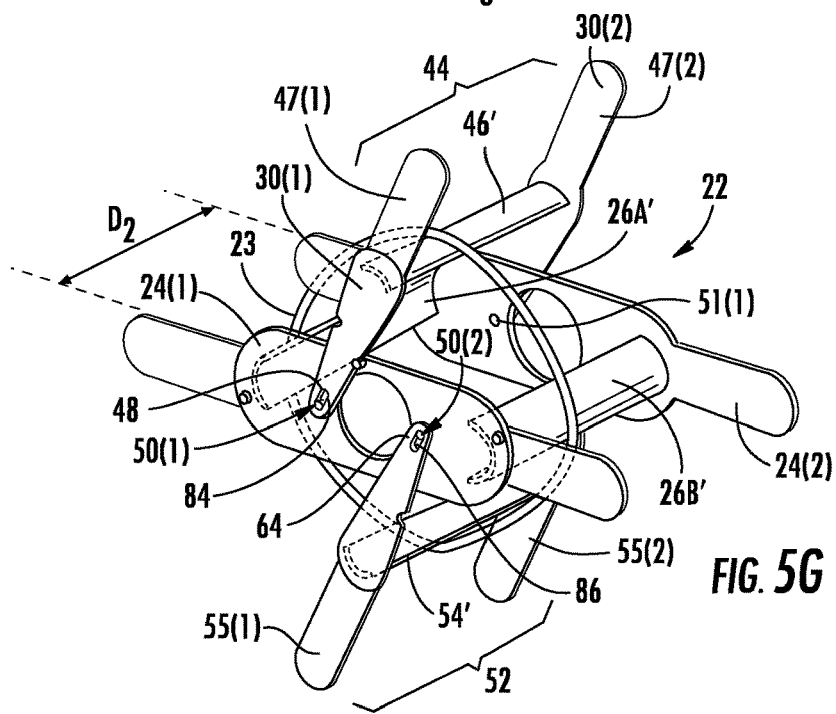
FIG. 5G is a perspective view illustrating an alternative embodiment of the transformable cable reel in FIG. 2A depicting crescent-shaped cross sections of traverse members.

Further, FIG. 5G depicts an alternative embodiment of the first, second and third traverse members 26A', 26B', 46(1)', 54(1)' comprising crescent-shaped cross sections. Cross sections may be, for example, circular-shaped as shown above in FIG. 2B, a mix of circular-shaped and crescent-shaped cross sections, or other shaped cross sections.

As discussed above, the first and second arms 47(1), 47(2) and the third and fourth arms 55(1), 55(2) pivot when the transformable cable reel 22 converts from the first reel configuration to the second reel configuration. In one non-limiting embodiment, as illustrated in FIGS. 5F and 5G, the transformable cable reel 22 is provided having a first reel configuration providing a first cable perimeter area to support a wound or spooled cable, the first reel configuration consuming a first volume $V_1$. The first cable perimeter area is the circumference between the traverse members 26A, 26B, 46, 54 times the distance or depth $D_2$ between the bodies 24(1), 24(2), or the distance or depth $D_2$ between the flanges 30(1), 30(2) of the first and second arms 47(1), 47(2). The transformable cable reel 22 also comprises a second reel configuration (shown in FIG. 2C) that consumes a second volume $V_2$ less than the first volume $V_1$, the second reel configuration supporting the same length or substantially the same length of spooled or would cable. Using the above referenced example of a transformable cable reel 22 and referring to FIG. 5F, the first arm 47(1) is pivotably attached to the first pivot 50(1) disposed in the body 24, offset a distance $D_3$ from a center point C1 of the body 24 in the first reel configuration. In this manner, the distal end 62(1) of the first arm 47(1) is located a distance $R_1(1)$ from the center point $C_1$ of the body 24 in the first reel configuration. Similarly, the third arm 52(1) is pivotably attached to the second pivot 50(2) disposed in the body 24, also offset a distance $D_4$ from the center point $C_1$ of the body 24 in the first reel configuration. In this manner, the distal end 66(1) of the third arm 52(1) can also be located at the distance $R_1(2)$ from the center point $C_1$ of the body (in this example, assuming the first arm 47(1) and the third arm 52(1) are the same length and pivotably attached to the body 24 from the same offset distance (i.e., $D_3=D_4$) but such is not necessary).

When the first arm 47(1) and the third arm 52(1) are rotated about the at least first and second pivots 50(1), 50(2), respectively, in the second reel configuration, because the first arm 47(1) and the second arm 52(1) are pivotably attached to first and second pivots 50(1), 50(2), respectively, disposed in the body 24 offset from the center point $C_1$, the distal ends 62(1), 66(1) of the first arm 47(1) and the second arm 52(1), respectively, will be disposed at a distance $R_1(1)$, $R_1(2)$, from the center point $C_1$ of the body 24 in the second reel configuration. In this embodiment, the distance R2 is greater than the distance $R_1(1)$ and $R_1(2)$. In this manner, transformable cable reel 22 can have a second volume $V_2$ in the second reel configuration less than the first volume $V_1$ in the first reel configuration but retain the same cable perimeter surface area of the first reel configuration. The transformable cable reel 22 can then support the same length of cable 23 in both the first reel configuration to the second reel configuration.

In this regard, FIG. 5F depicts the movement of these of the first and second arms 47(1), 47(2) and the third and fourth arms 55(1), 55(2) from the first reel configuration to the second reel configuration shown by the first and second arms 47(1), 47(2) and the third and fourth arms 55(1), 55(2). Note that the intermediate positions depicted by the first and second arms 47(1), 47(2) and the third and fourth arms 55(1), 55(2) have longer distances $R_1(2)$ from the longitudinal axis $A_3$ of the body 24 than at the first reel configuration represented by the first and second arms 47(1), 47(2) as distance $R_1(1)$. As the cable 23 may be relatively taut and inflexible about the first, second and third traverse members 26A, 26B, 46, 54, the first and second arms 47(1), 47(2) and the third and fourth arms 55(1), 55(2) will have difficulty pivoting to the second reel configuration through the intermediate positions depicted by the first and second arms 47(1), 47(2) and the third and fourth arms 55(1), 55(2).

Figure 5H:
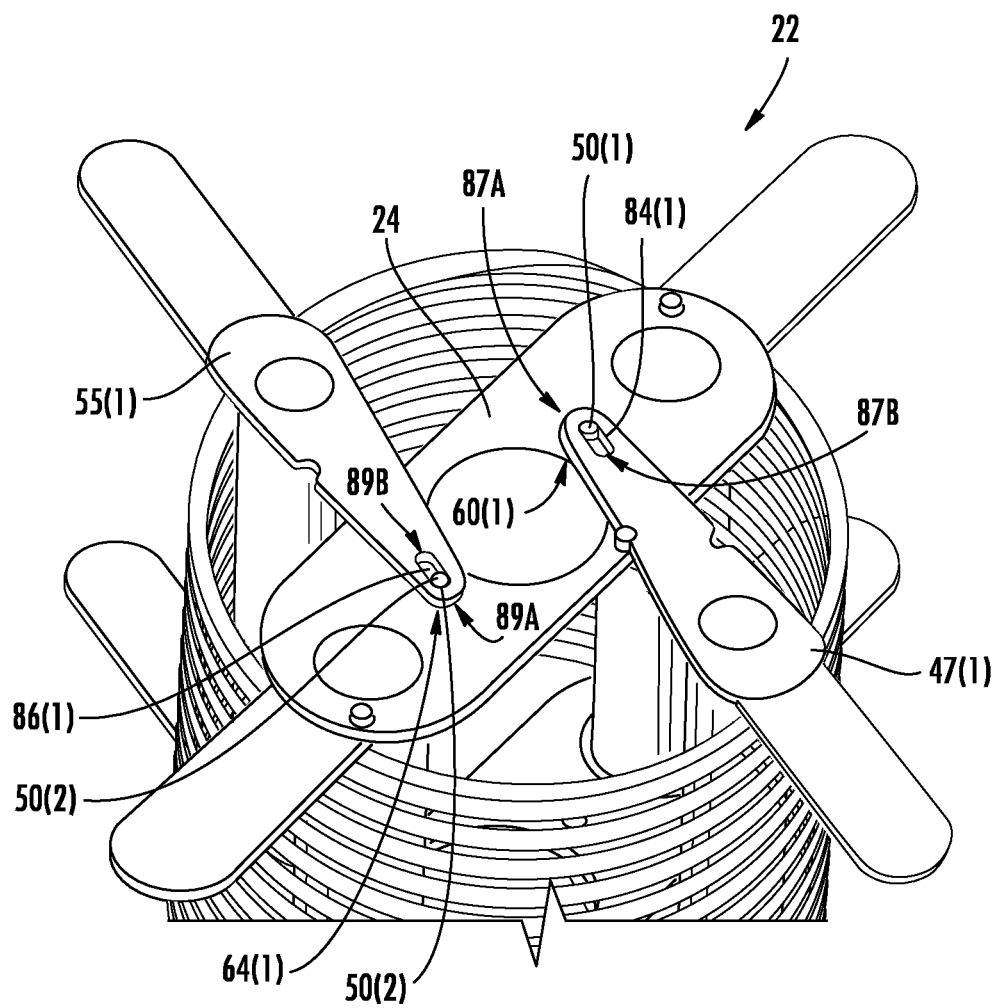
FIG. 5H is a perspective view illustrating an alternative embodiment of the transformable cable reel in FIG. 2A depicting closed slots.
Figure 51:
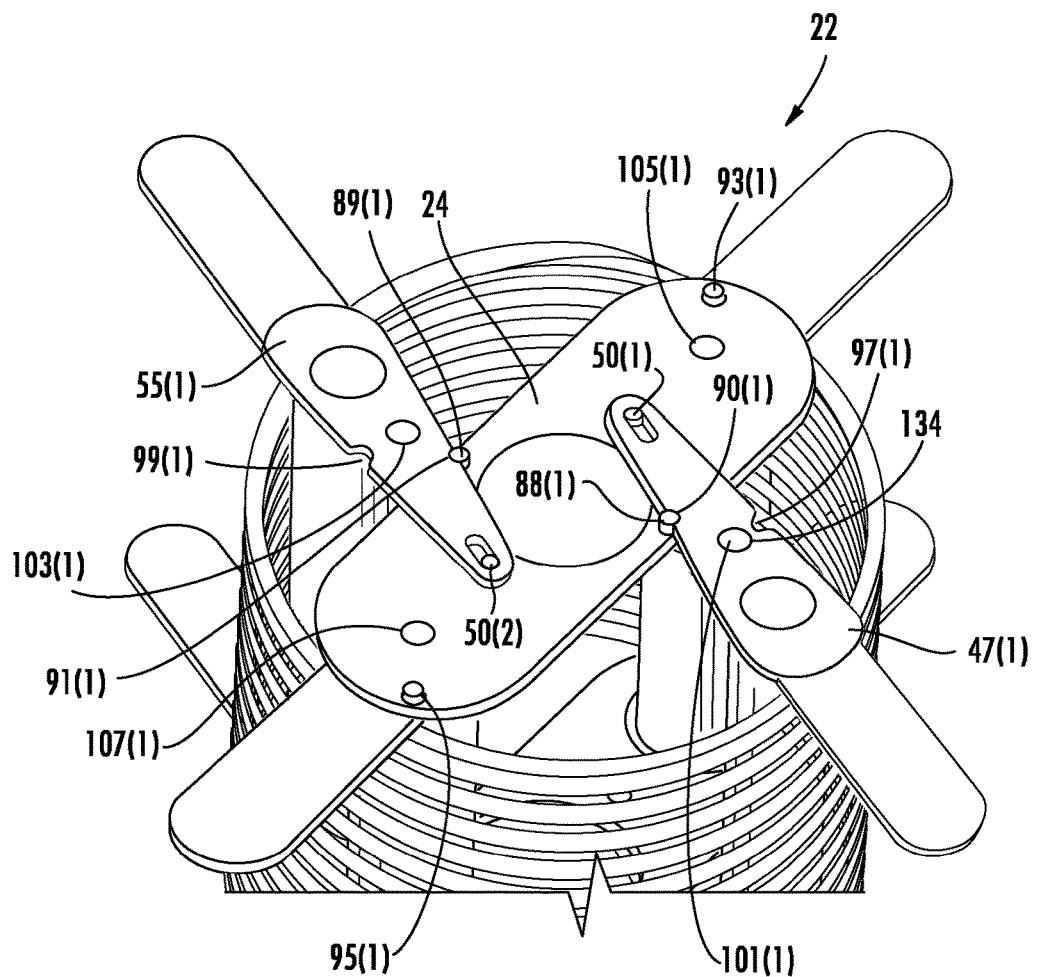

To resolve the difficulty to pivot issue, as illustrated in FIG. 5H, the first and second arms 47(1), 47(2) and the third and fourth arms 55(1), 55(2) can each includes a first slot 84(1) and a second slot 86(1) (only shown in first arm 47(1) and third arm 55(1), but also present in the second arm 47(2) and the fourth arm 55(2)) to enable the first and second arms 47(1), 47(2) and the third and fourth arms 55(1), 55(2) to pivot through this intermediate position. The first and second slots 84(1), 86(1) may be located at proximal ends 60(1), 64(2) of the first arm 47(1) and third arm 55(1). The first and second slots 84(1), 86(1) may each have first ends 87A, 87B and second ends 89A, 89B respectively as shown in FIG. 5H. The first pivots 50(1), 50(2) (as well as the second pivots 50(2), 51(2)—not shown) are disposed within and can move or slide in the first slot 84(1) and second slot 86(1) from their respective first ends 87A, 89A to their second ends 87B, 89B, respectively, so that the second and third traverse members 46, 54 can be moved in closer to the longitudinal axis $A_3$, as needed, to permit the first and second arms 47(1), 47(2) and the third and fourth arms 55(1), 55(2) to pivot under the burden of the taut cable 23, when transforming from the first reel configuration to the second reel configuration.

The transformable cable reel 22 may also be locked in the first reel configuration by one or more stops 88(1), 89(1) or other features of the body 24 which are disposed in the rotational path of the first arm 47(1) and the third arm 55(1), as illustrated in FIG. 5I, to limit rotation in the first reel configuration. One or more stops or other features may also be disposed in the body 24(2) (see FIG. 5A) which are disposed in the rotational path of the second arm 47(1) and the fourth arm 55(1), not illustrated in FIG. M. For example, the one or more stops 88(1), 89(1) may be protrusions on a surface of the body 24 forming an interference fit with the first arm 47(1) and the third arm 55(1) to lock the first arm 47(1) and the third arm 55(1) in place in the first reel configuration. Grooves 90(1), 91(1) may be disposed in the first and third arms 47(1), 55(1), to receive the stops 88(1), 89(1), as illustrated in FIG. 5I.

As also illustrated in FIG. 5I, the transformable cable reel 22 may also be locked in the second reel configuration by one or more stops 93(1), 95(1) or other features of the body 24 which are disposed in the rotational path of the first arm 47(1) and the third arm 55(1), as illustrated in FIG. 5I, to limit rotation in the second reel configuration. One or more stops or other features may also be disposed in the body 24(2) (see FIG. 5A) which are disposed in the rotational path of the second arm 47(1) and the fourth arm 55(1), not illustrated in FIG. 5I. For example, the one or more stops 93(1), 95(1) may be protrusions on a surface of the body 24 forming an interference fit with the first arm 47(1) and the third arm 55(1) to lock the first arm 47(1) and the third arm 55(1) in place in the first reel configuration. Grooves 97(1), 99(1) may be disposed in the first and third arms 47(1), 55(1), to receive the stops 93(1), 95(1), as illustrated in FIG. 5I.

In addition, FIG. 5I depicts various exemplary locking mechanisms that may be employed to secure the first and second arms 47(1), 47(2), and the third and fourth arms 55(1), 55(2), in various angular positions upon the bodies 24(1), 24(2) in the first and/or second reel configurations. For example, FIG. 5I illustrates locking orifices 101(1), 103(1) disposed in the first arm 47(1) and third arm 55(1) that are configured to engage with dimples 105(1), 107(1) disposed in the body 24. The dimples 105(1), 107(1) may be, for example, a raised curvilinear surface that the first arm 47(1) and third arm 55(1) can pivot upon with the dimples 105(1), 107(1) be disposed in the locking orifices 101(1), 103(1) to lock and secure the first arm 47(1) and third arm 55(1) into the desired angular positions. Note that in FIGS. 5H and 5I, features were discussed with regard to the first arm 47(1) and third arm 55(1). However, note that the same features could also be provided in the second arm 47(2) and fourth arm 55(2), if desired.

Figure 6A:
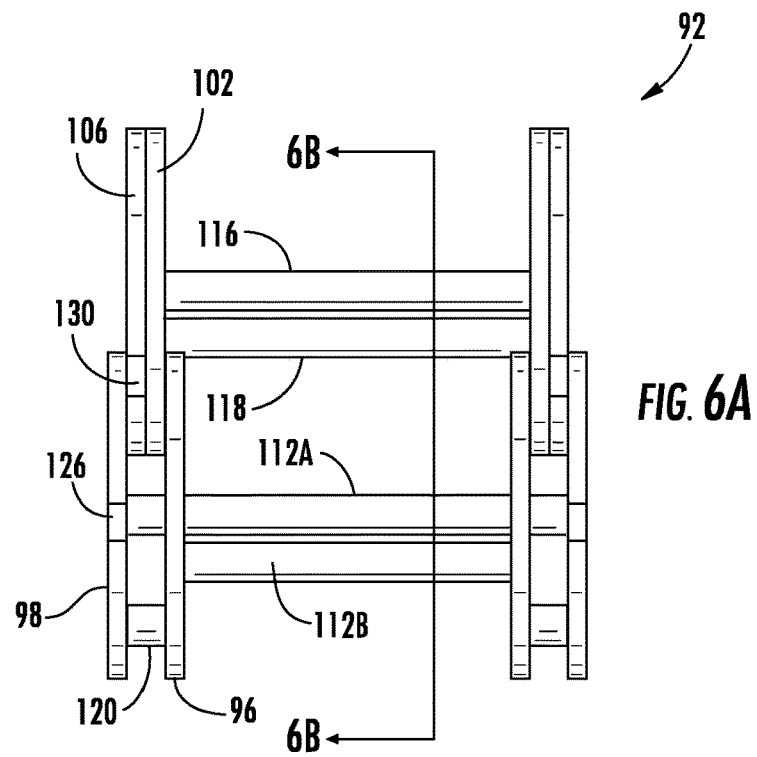
FIG. 6A is a side view illustrating an alternative embodiment of the transformable cable reel comprising a four-member linkage in a first reel configuration.
Figure 6B:
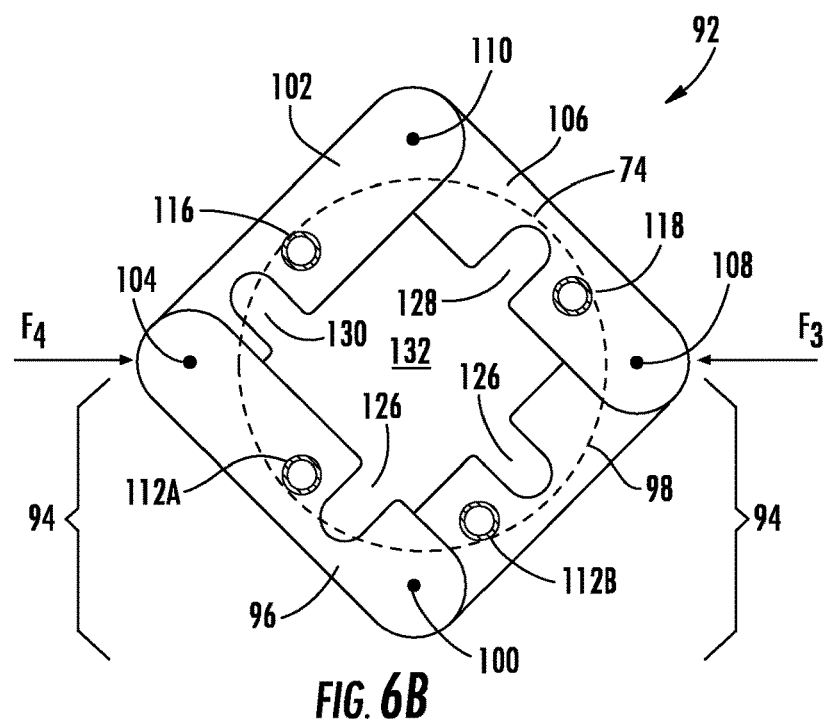
FIG. 6B is a perspective view illustrating the alternative embodiment of FIG. 6A.

FIGS. 6A-6C illustrate another exemplary transformable cable reel 92 that can be transformed from a first reel configuration to a second reel configuration and vice versa. In this embodiment in reference to FIG. 6A the body 94 is comprised of a first sub-body 96 and a second sub-body 98 pivotably connected at a third pivot 100. A first arm 102 may be connected to the first sub-body 96 at a first pivot 104. A second arm 106 may be connected to the second sub-body 98 at a second pivot 108. The first and second arms 102, 106 may be pivotably attached at a fourth pivot 110. The transformable cable reel 92 may contain one or more first traverse members 112A, 112B upon the first and second sub-bodies 96, 98 respectively. The one or more first traverse members 112A may be attached between the first and third pivots 104, 100. The one or more first traverse members 112B may be attached between the second and third pivots 108, 100. The first arm 102 may have a second traverse member 116 attached between the first and fourth pivots 104, 110. The second arm 106 may have a third traverse member 118 attached between the second and fourth pivots 108, 110.

FIG. 6B illustrates a side view of the transformable cable reel 92 showing the pivotable arrangement. A spacer 120(1) may be disposed between the first and second sub-bodies 96, 98 at the third pivot 114 to provide sufficient spacing so that the first and second sub-bodies 96, 98 are able to align during pivoting. A spacer 120(2) may also be disposed between the complementary sub-bodies 96(2), 98(2) for the same purpose.

FIG. 6A illustrates the transformable cable reel 92 in a first reel configuration where the first, second and third traverse members 112, 116, 118 are arranged to support a geometric circular cylinder 124. Opposing forces $F_3$ and $F_4$ may be applied to the first and second pivots 104, 108 to convert the transformable cable reel 92 to a second reel configuration depicted in FIG. 6D where the first, second and third traverse members 112, 116, 118 are aligned along the longitudinal axis $A_3$ of the first and second sub-bodies 96, 98. When the transformable cable reel 92 is in the second reel configuration, the first and second sub-bodies 96, 98 may also be aligned. The one or more first traverse members 112A on the first sub-body 96 may communicate with one or more grooves 126 on the second sub-body 98. The one or more first traverse members 112B on the second sub-body 98 may communicate with one or more grooves 126 on the first sub-body 96. The second traverse member 116 on the first arm 102 may communicate with a groove 128 on the second arm 106. The third traverse member 118 on the second arm 106 may communicate with a groove 130 on the first arm 102.

An orifice 132 may be formed in the transformable cable reel 92 in the volume surrounded by the first and second sub-bodies 96, 98, and the first and second arms 102, 106. The orifice 132 may be used to insert a center mount to provide rotational power to the transformable cable reel 92.

Figure 7:
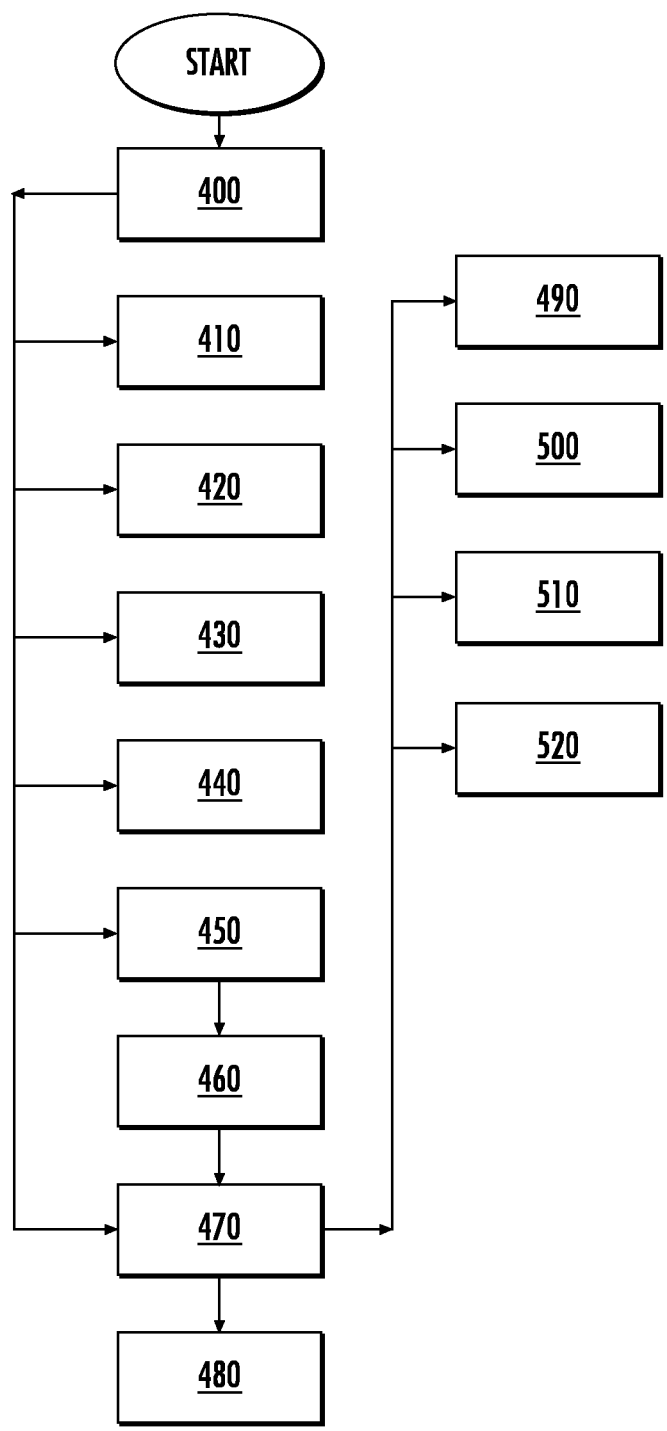
FIG. 7 is a flowchart diagram illustrating an exemplary process that may utilize the exemplary transformable cable reels to spool cable onto the transformable cable reel and payout a portion of the fiber optic cable while in a first reel configuration before transforming into the second reel configuration.

FIG. 7 depicts a method for operating the transformable cable reel assembly 22. The method may first include providing a transformable cable reel 22 comprising a body 24 including at least one first cable contact surface 28A, 28B to form at least one first portion of a first reel configuration. The transformable cable reel 22 may also include second and third traverse members 46, 54 disposed on first and second arms 47(1), 47(2), and the third and fourth arms 55(1), 55(2), respectively. The transformable cable reel 22 may also include the first and second arms 47(1), 47(2), and the third and fourth arms 55(1), 55(2) pivotably attached to the body 24, and the second and third traverse members 46, 54 providing a second cable contact surface 70 and a third cable contact surface 72, respectively, to form a second portion and third portion of the first reel configuration. Next, the first and second arms 47(1), 47(2) may be disposed at a first angle $E_1$ relative to the body 24. The third and fourth arms 55(1), 55(2) may be disposed at a first angle $E_2$ relative to the body 24 to dispose the second and third traverse members 46, 54 in a first reel configuration.

Next, cable 23 may be spooled onto the at least one first cable contact surface 28A, 28B, the second cable contact surface 70, and the third cable contact surface 72 in the first reel configuration (block 400 in FIG. 7). Next, a winding fixture 78 may be attached to the transformable cable reel 22 to dispose a plurality of arcuate cantilevers 80 of the winding fixture 78 between the at least one first cable contact surface 28A, 28B, the second cable contact surface 70, and the third cable contact surface 72 (block 410 in FIG. 7). In another independent or dependent embodiment, the winding fixture 78 may be removed from the transformable cable reel 22 after the cable 23 has been spooled (block 420 in FIG. 7). In another independent or dependent embodiment, the transformable cable reel 22 may be rotated about the cable 23 when spooling the cable 23 (block 430 in FIG. 7). It is noted the phrase "to be rotated about" covers both rotating the first and second arms 47(1), 47(2), and the third and fourth arms (55(1), 55(2) and applying equal and opposite forces to the transformable cable reel 22, depicted for example in FIG. 4A.

In independent or dependent embodiment of the method, a subsequent step may be to dispose a pigtail end of the cable 23 into a pigtail bracket on the body 24 (block 440 in FIG. 7). In independent or dependent embodiment, at least a portion of the cable 23 required for installation is payed out ("dispensed") from the transformable cable reel 22 assembly (block 450 in FIG. 7). In another independent or dependent embodiment, breakaway flanges 36, 38 disposed on first and second ends of the body 40, 42 are removed after the paying out of the at least a portion of the cable 23 from the transformable cable reel 22 (block 460 in FIG. 7). In independent or dependent embodiment of this method, a next step may be to rotate the first and second arms 47(1), 47(2) to an alternative first angle and rotate the third and fourth arms 55(1), 55(2) to generally align the first, second, and third traverse members 26A, 26B, 46, 54 along a longitudinal direction $A_2$ of the body 24 in a second reel configuration (block 470 in FIG. 7).

In independent or dependent embodiment, the transformable cable reel 22 has a first volume in the first reel configuration greater than a second volume in the second reel configuration (block 480 in FIG. 7). In another embodiment, the first and second arms 47(1), 47(2), and the third and fourth arms 55(1), 55(2) results in the remaining portion of the cable 23 to not be in contact with the at least one first traverse members 26 (block 480 in FIG. 7). In independent or dependent embodiment, the transformable cable reel 22 may be stored in the second reel configuration in fiber optic equipment (block 490 in FIG. 7).

In independent or dependent embodiment, the first pivots 50(1), 51(1) may be moved. The first pivots 50(1), 51(1) that may be disposed in the first closed slots 84 disposed in the first and third arms 47(1), 47(2) from a first end 87A of the first closed slot 84 to a second end 87B of the first closed slots 84 (see FIG. 5H). The first pivots 50(1), 50(2) may be moved during the rotation of the first and second arms 47(1), 47(2) to adjust a distance between the second traverse member 46 and the body 24. Further, the second pivots 50(2), 51(2) may be moved. The second pivots 50(2), 51(2) may be disposed in the second closed slots 86 disposed in the third and fourth arms 55(1), 55(2) from the first ends 89A of the second closed slots 86 to the second ends 89B of the second closed slots 86. The second pivots 50(1), 50(2) may be moved during the rotation of the third and fourth arms 55(1), 55(2) to adjust a distance between the third traverse member 54 and the body 24 (block 500 in FIG. 7).

In independent or dependent embodiment, the first and second arms 47(1), 47(2) may be rotated until the first and second arms 47(1), 47(2) encounter the stops 88, 93 disposed on the body 24. The third and fourth arms 55(1), 55(2) may be rotated until the third and fourth arms 55(1) encounter the stops 89, 95 disposed on the body 24 (block 410 in FIG. 7). In independent or dependent embodiment, when the first and second arms 47(1), 47(2) and third and fourth arms 55(1), 55(2) may be rotated, then the remaining portion of the cable 23 remaining on the transformable cable reel 22 will not be in contact with the at least one first traverse member 26 (block 520 in FIG. 7).

FIG. 8A depicts an embodiment of the transformable cable reel 22 with a body 24 including a center orifice 32 and one or more secondary orifices 34(1), 34(2) (see FIG. 2B). As discussed above in relation to FIG. 3A, the winding fixture 78 may be attached to transformable cable reel 22. The center orifice 32 may be a circular shape concentric with the axis of rotation $A_0$ of the transformable cable reel 22. The one or more secondary orifices 34 may be disposed within the first, second, and third traverse members 26, 46, 54. In reference to the features on the center orifice 32, the winding fixture 78 may further include a center cantilever 128 and one or more secondary cantilevers 130A, 130B. The cantilevers 130A, 130B are configured to be disposed within the secondary orifices 34(1), 34(2) disposed inside the second and third traverse members 46, 54 when the winding fixture 78 is attached to the transformable cable reel 24 to align the fixture 78, and the arcuate cantilevers 80 with the transformable cable reel 24.

As depicted in FIG. 8B, the center cantilever 128 may be configured to be disposed within the center orifices 32 of the body 24 and the one or more secondary cantilevers 130 may be configured to be disposed within the one or more secondary orifices 34. In effect, the center cantilever 128 may serve as an axis upon which the transformable cable reel 22 may pivot.

Figure 9A:
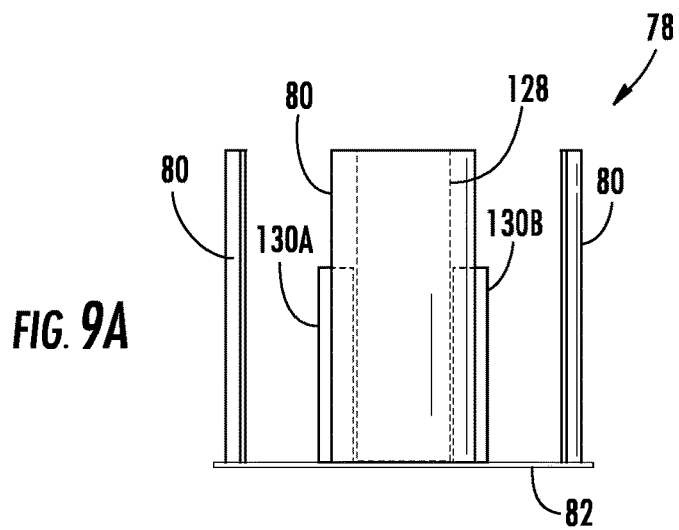
FIG. 9A is a side view in the transverse direction of the winding fixture of FIG. 8A.
Figure 9B:
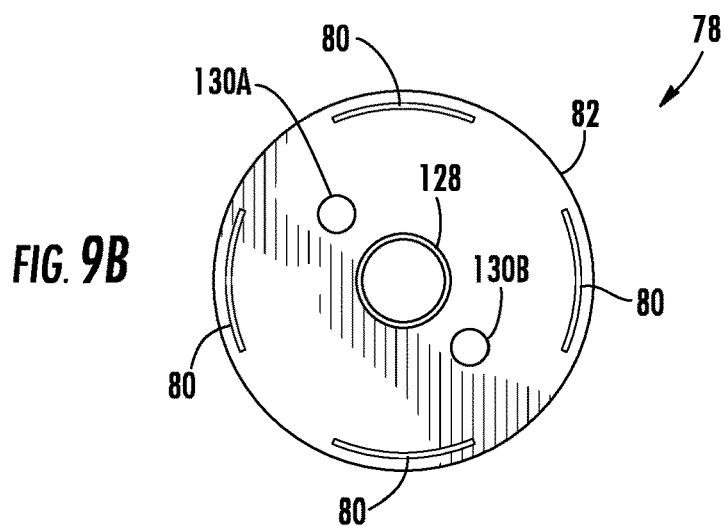
FIG. 9B is a top view of the winding fixture of FIG. 9A.
Figure 9C:
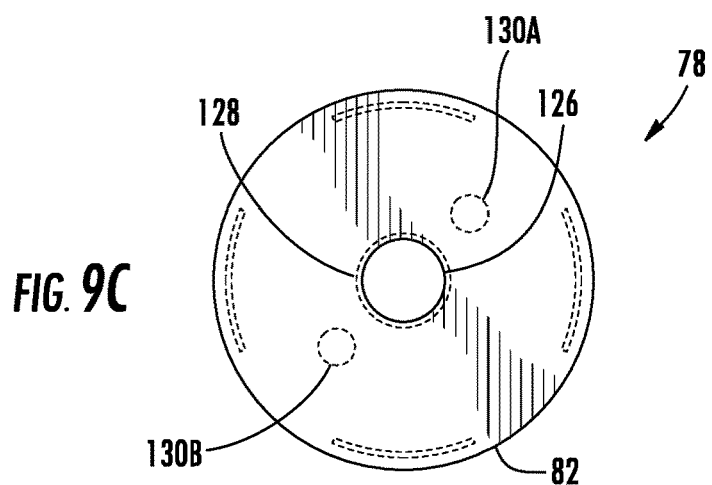
FIG. 9C is a bottom view of the winding fixture of FIG. 9A.

FIG. 9A depicts a side view of the winding fixture 78 illustrating the plurality of arcuate cantilevers 80, the center cantilever 128 and the one or more secondary cantilevers 130 attached to a base 82. FIG. 9B is a view from the top of the winding fixture 78. FIG. 9C is a view from the bottom of the winding fixture 78. A center base orifice 126 may be concentric to the center cantilever 128 on the base 82. The winding fixture 78 may need flexibility to be removed from the transformable cable reel 22 after the cable 23 is wound or spooled thereon. Flexibility may be particularly required in the plurality of arcuate cantilevers 80 that may need to bend to separate from the wound or spooled cable 23. Thus, the winding fixture 78 may be made of strong flexible material, for example, plastic.

Figure 10:
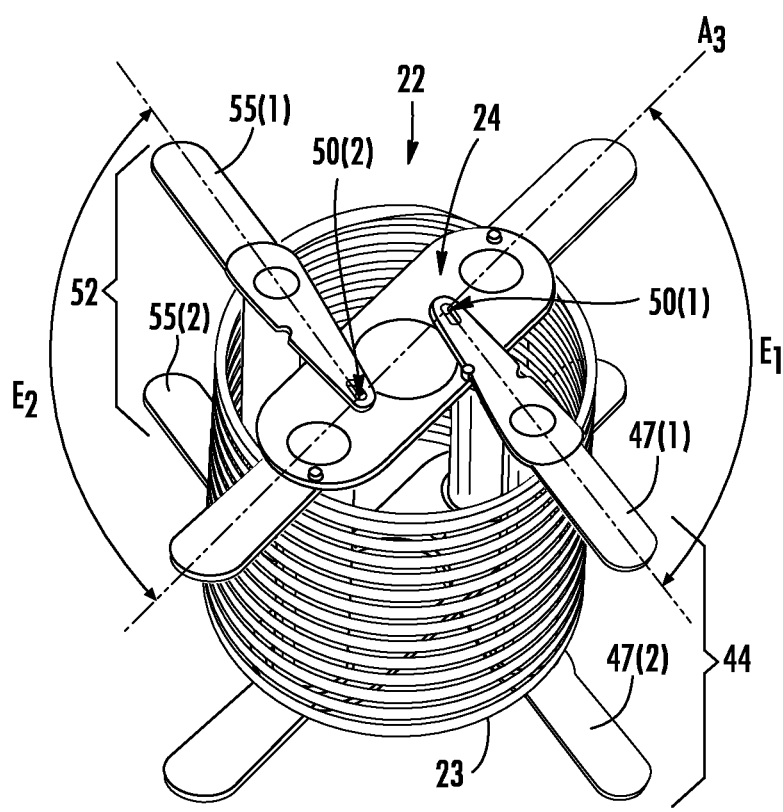
FIG. 10 is a perspective view illustrating the exemplary transformable cable reel of FIG. 2A showing the first and second angles of the first and second arms with respect to the longitudinal axis of the body.
Figure 11:
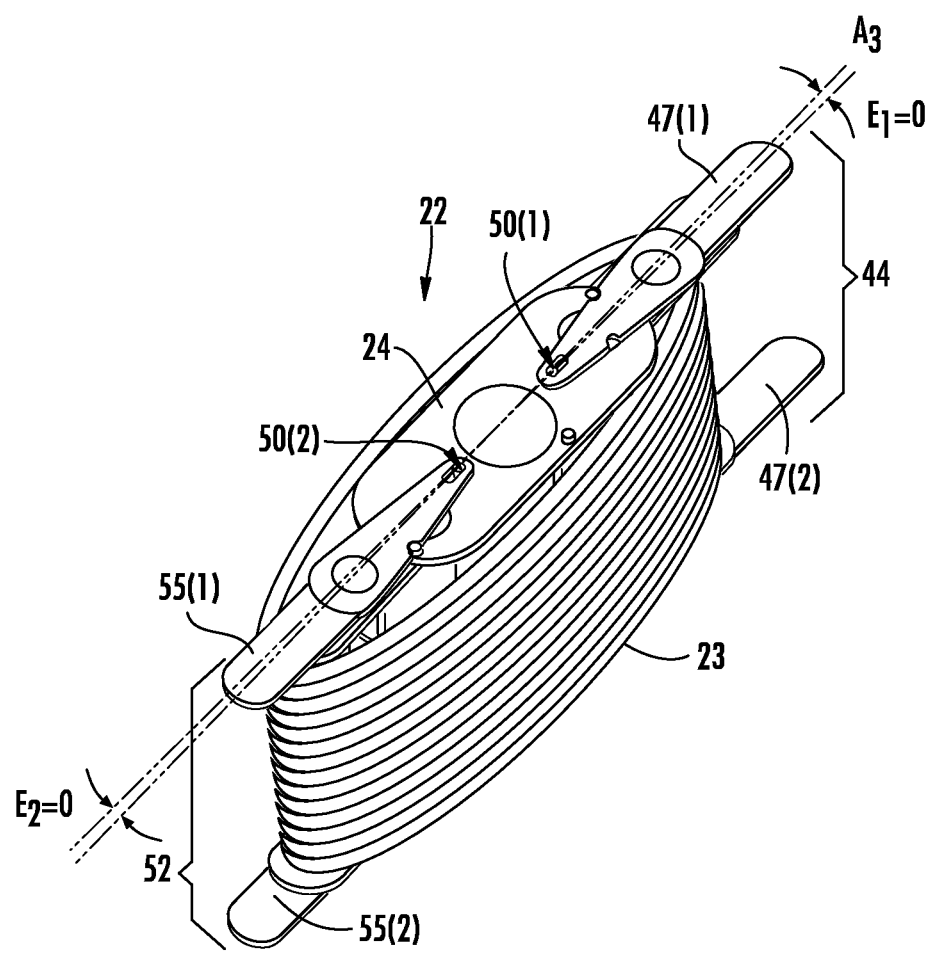
FIG. 11 is a perspective view illustrating the exemplary transformable cable reel of FIG. 2C showing the first and second angles of the first and second arms with respect to the longitudinal axis of the body.

To further summarize the example of the transformable cable reel 24, FIG. 10 depicts the transformable cable reel 22 in the first reel configuration. The first and second arms 47(1), 47(2) are illustrated orientated at an angle $E_1$ ("first angle") with respect to the longitudinal axis $A_3$. The third and fourth arms 55(1), 55(2) are illustrated orientated at an angle $E_2$ ("second angle") with respect to the longitudinal axis $A_3$. FIG. 11 depicts the transformable cable reel 92 in the second reel configuration. The first arm 102 is illustrated orientated at an angle $E_1$ ("first angle") of zero with respect to the longitudinal axis $A_3$ and the second arm 106 is illustrated orientated at an angle $E_2$ ("second angle") with respect to the longitudinal axis $A_3$. Note that the volume of the transformable cable reel 24 in FIG. 11 is less than the volume of the transformable cable reel 24 in FIG. 10. The transformable cable reel 24 in the second reel configuration in FIG. 11 may used for neat storage of excess cable 23 as well as the other previously discussed applications and advantages.

For example, the transformable cable reels disclosed herein can be provided for a fiber optic distribution network for a multi-floor multiple dwelling unit (MDU), as an example, as discussed in FIGS. 12-19 discussed herein. The network includes a local convergence point (LCP) which may be located in a lower level of the MDU, for example, the basement. The LCP receives a feeder cable that provides optical communication service to the MDU from a service provider. One or more preconnectorized riser cables having multi-fiber connectors on each end optically connect to the feeder cable through the LCP. The riser cable extends from the LCP to one or more upper distribution levels of the MDU. At the distribution level, the riser cable is received by a network access point. The connection between the riser cable and the subscriber premises may be through tether cables branched off from the riser cable at each distribution level. The tether cables may then be connected to subscriber premises via one or more drop cables at the network access point. Alternatively, or additionally, an individual riser cable may be extended to the distribution level. The network access point may be referred to as a transition box or a fiber distribution terminal (FDT).

The FDT may include one or more multi-fiber-to-multi-fiber adapters to provide for connection of the riser cable to one or more drop cables. The drop cable extends to the subscriber premises at that distribution level to provide optical communication service to the subscriber. Any riser cable slack may be stored in one or more of the FDT or a slack enclosure. Additionally, the riser cable slack may be stored on the payout reel, with the payout reel removably mounted in the FDT, a patch panel enclosure, or the slack enclosure. The slack storage enclosure may be located at or adjacent to the LCP or at the distribution level.

The multi-fiber-to-multi-fiber adapters located at the network access point may have dual shutters, one on each end of the adapter. The shutters are adapted to be automatically close against the end of the adapter when a multi-fiber connector is not inserted in that end of the adapter. In this manner, the shutters may provide sealing of the adapter against the environment, keeping the adapter protected and clean when not in use. The multi-fiber adapter may be keyed up and down to coordinate with the polarity of the multi-fiber connectors. The adapters may be mounted in a cassette, which is removably mounted in the network access point. Alternatively, the adapter may be removably mounted to a panel, which may be removably mounted in the network access point.

Further, a transition box/FDT may be located in the stair well of a MDU and provide a termination point for cable pulled or dropped vertically in the MDU. When located in the stairwell the FDT may mounted onto or in proximity to a conduit, and in such case be referred to as a "Pipe-n-Box" or a "Pencil Box." The FDT provides a point at which riser cable transitions to horizontal cable runs. This location also serves as a point at which riser cable slack may be stored. The transition box may also be located within a telecommunications closet and referred to as a "closet box." The solution may include one or more termination boxes in the stairwell and one or more transition boxes in the telecommunications closet.

The transition box/FDT may have an enclosure with a pivotable panel having a first side and a second side mounted therein. Fiber optic adapters mount to the pivotable panel and may be accessed from the first side or the second side by pivoting the pivotable panel.

A transformable cable reel may be included. The transformable cable reel acts as conventional cable-reel for shipping cable to customers and for paying out cable for installation. Additionally, though, the transformable cable reel may be reduced to a smaller form factor mounted in an enclosure, for example, a transition box/FDT, and function as a modular slack storage spool. In this regard, users may pull or drop cable in the riser as dispensed from the transformable cable reel and terminate or connect horizontally run cable with vertically run cable. Cable slack is then stored within the transition box either in a stairwell or in a telecommunications closet.

The transformable cable reel may have a telescoping and/or adjustable frame having a first end and a second end. A first hub may connect to the first end and a second hub may connect to the second end. One or more arms extend radially from the first hub and the second hub. A plurality of cable supports extend between the first hub and the second hub. The plurality of cable supports are adapted to support a length of cable wound or spooled around the transformable cable reel. The length of each of the plurality of cable supports is shortenable and/or movable allowing the telescoping and/or adjustable frame to reduce in length moving the first hub closer to the second hub. When the length of the telescoping frame is reduced, the transformable cable reel is mountable in an enclosure providing cable slack storage.

Figure 1:
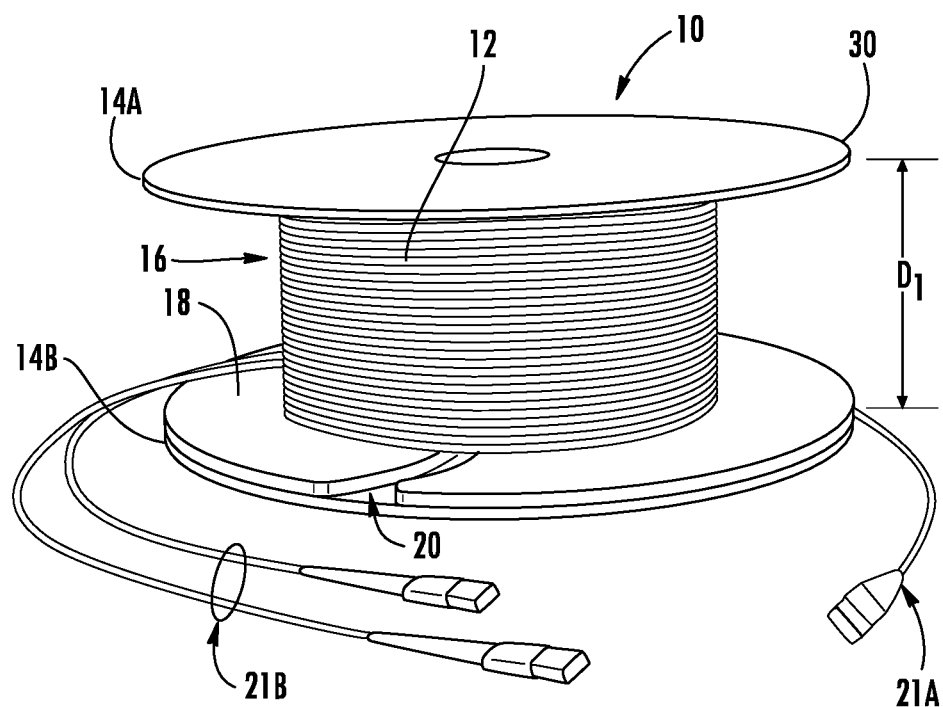
FIG. 1 is a perspective view of a cable reel in the prior art.
Figure 12:
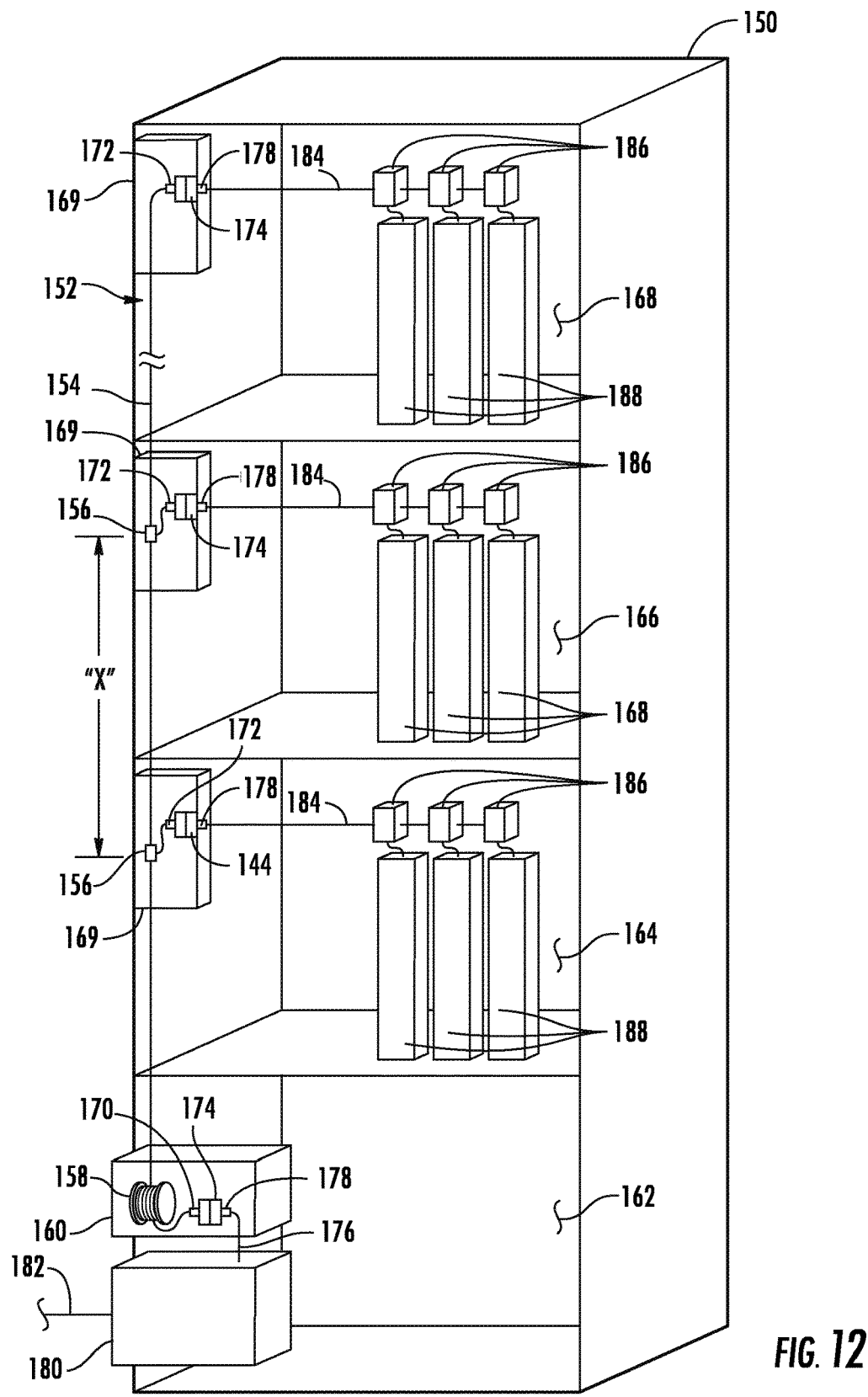
FIG. 12 is a schematic diagram of a perspective elevation view of a multiple dwelling unit (MDU) with an exemplary fiber optic network installed therein, wherein a riser cable with pre-set tap points extends from a payout reel in a patch panel enclosure located at a lower level to multiple distribution levels.

In this regard, FIG. 12 is a schematic diagram of a perspective elevation view of the MDU 150 with an exemplary fiber optic network 152 installed therein. A riser cable 154 with pre-set mid-span access points 156 extends from a payout reel 158. The riser cable 154 pays out from a payout reel 158. Once the riser cable 154 is paid out from the payout reel 158 to multiple distribution levels 164, 166, 168, the payout reel 158 is removably mounted in a patch panel enclosure 160. Although in FIG. 1 three higher levels 164, 166, 168 are illustrated, the fiber optic network 152 may have any number of distribution levels. The riser cable 154 is preconnectorized with multi-fiber connectors 170, 172 at each end of the riser cable 154. The patch panel enclosure 20 has a multi-fiber-to-multi-fiber adapter assembly 174, which receives a first multi-fiber connector 170. A distribution cable 176 preconnectorized with a multi-fiber connector 178 is received by and connects to the multi-fiber adapter assembly 174 in the patch panel enclosure 20 to establish an optical connection between the riser cable 154 and the distribution cable 176. The distribution cable 176 routes to a local convergence point (LCP) 180. The LCP 180 receives a feeder cable 182 which provides optical communication service to the MDU 150 from a service provider.

During installation, the riser cable 154 pays out from the payout reel 158 such that the riser cable 154 extends generally in an upward direction from the lower level 162 to each ascending distribution level 164, 166, 168 in succession with distribution level 168 being the highest distribution level in the MDU 150. The mid-span access points 156 are preset such that they are separated by a distance "X" along the length of the riser cable 154. The distance "X" is preset at the factory to a certain value depending on the distance between adjoining distribution levels 164, 166. As examples, the distance "X" may be set at 10 feet, 12 feet, 14 feet, 15 feet, and the like. In this manner, as the riser cable 154 pays out and installed in the MDU 150, the preset mid-span access points will align, generally with each distribution level 164, 166 of the MDU 150. However, the one exception to this may be the highest distribution level, since the end of the riser cable 154 would extend to that level and would not have a mid-span access point. Any riser cable 154 slack, due to the presetting of the distance "X" or otherwise, may be stored on the payout reel 158, in the patch panel enclosure 160 and/or a slack enclosure (not shown in FIG. 12). Slack may also be stored loosely at the lower level 162, in one or more fiber distribution terminals 169 located at one or more of the distribution levels 164, 166, 168. Additionally the payout reel 158 may be removably mounted in the slack housing or may be mounted or located separate from the patch panel enclosure 160 and/or slack enclosure and/or from the FDT 169 at one or more of the distribution levels 164, 166, 168.

The riser cable 154 may be any number of optical fibers. At each mid-span access point 156, certain of the optical fibers may be furcated out from the riser cable 154 in a FDT 169 located at the distribution level 164, 166. As examples, 6, 8 or 12 fibers may be furcated out from the riser cable 154 and terminated with the second multi-fiber connector 172. At the highest distribution level 168, the optical fibers remaining in the riser cable 154 after furcating out the optical fibers at lower distribution levels 164, 166 are terminated with the second multi-fiber connector 172. The second multi-fiber connector 172 may be received by a multi-fiber adapter assembly 174 removably mounted in the FDT 169 at the distribution level 164, 166, 168. Alternatively, instead of the multi-fiber adapter assembly 174, the second multi-fiber connector may be received by and connected to a connector module (not shown in FIG. 12) removably mounted in the FDT 169.

A multi-fiber bundled drop cable 184 preconnectorized with a multi-fiber connector 178 is received by and connects to the multi-fiber adapter assembly 174, or the connector module, as the case may be, in the FDT 169 located at the distribution reel 164, 166, 168. In this manner an optical connection is established between the riser cable 154 and the multi-fiber bundled drop cable 184. The multi-fiber bundled drop cable 184 routes to one or more drop boxes 186 associated with subscriber premises 188 located at the distribution level 164, 166, 168. One or more optical fiber separates from the multi-fiber bundled drop cable 184 at the drop box 186 and extends to the subscriber premises 188. In this manner, optical communication service is provided to the subscriber premises 188.

Figure 13:
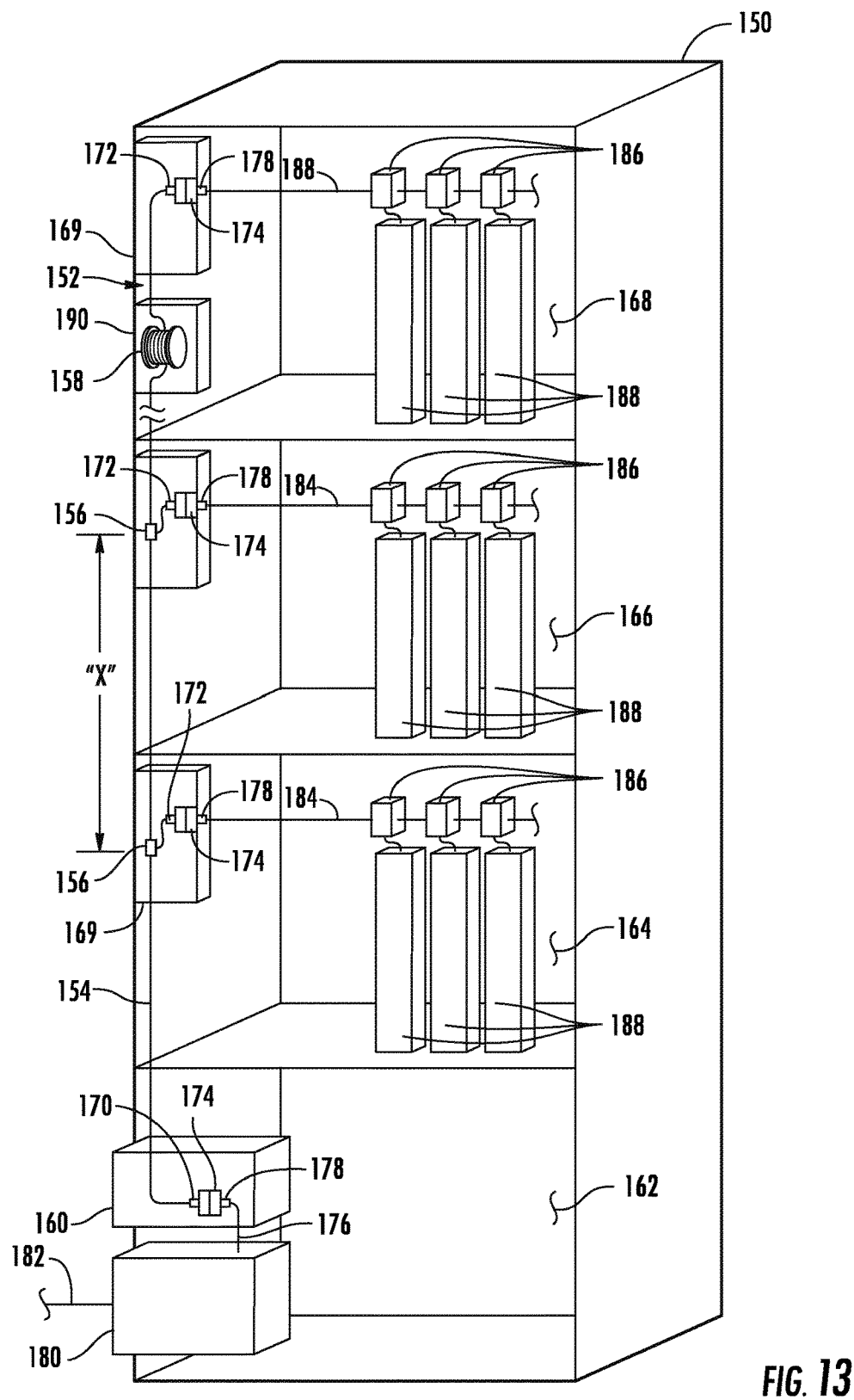
FIG. 13 is a schematic diagram of a perspective elevation view of a MDU with an exemplary fiber optic network installed therein, wherein a riser cable with pre-set tap points extends from a payout reel in a slack enclosure on a distribution level to other distribution levels and to a lower level.

FIG. 13 is a schematic diagram of a perspective elevation view the MDU 150 with an exemplary fiber optic network 152 installed therein. The riser cable 154 with pre-set mid-span access points 156 extends from a payout reel 158 in a separate slack enclosure 190 located at the highest distribution level 168 to the other distribution levels 164, 166 and the lower level 162. The fiber optic network 252 is similar to fiber optic network 152 shown on FIG. 12, and, therefore, the aspects and/or components of the fiber optic network 112 described with respect to FIG. 12 will not be described again with respect to FIG. 13. In FIG. 13, after the riser cable 154 is paid out, the payout reel 158 is removably mounted in the slack enclosure 190 located at the highest level 168 instead of the patch panel enclosure 160. In this manner, during installation, the riser cable 154 pays out from the payout reel 158 such that the riser cable 154 extends generally in a downward direction from the highest distribution level 168 to each descending distribution level 164, 166 in succession, and to the patch panel enclosure 160.

The patch panel enclosure 160 includes a multi-fiber adapter assembly 174 but may not include the payout reel 158 since that is located at the highest distribution level 168 in fiber optic network 252. However, the multi-fiber-to-multi-fiber adapter assembly 174 in the patch panel enclosure 160 receives the first multi-fiber connector 170 and optically connects it with the with a multi-fiber connector 178 of the distribution cable 176 to establish an optical connection between the riser cable 154 and the distribution cable 176 as described above with respect to FIG. 12.

Figure 14:
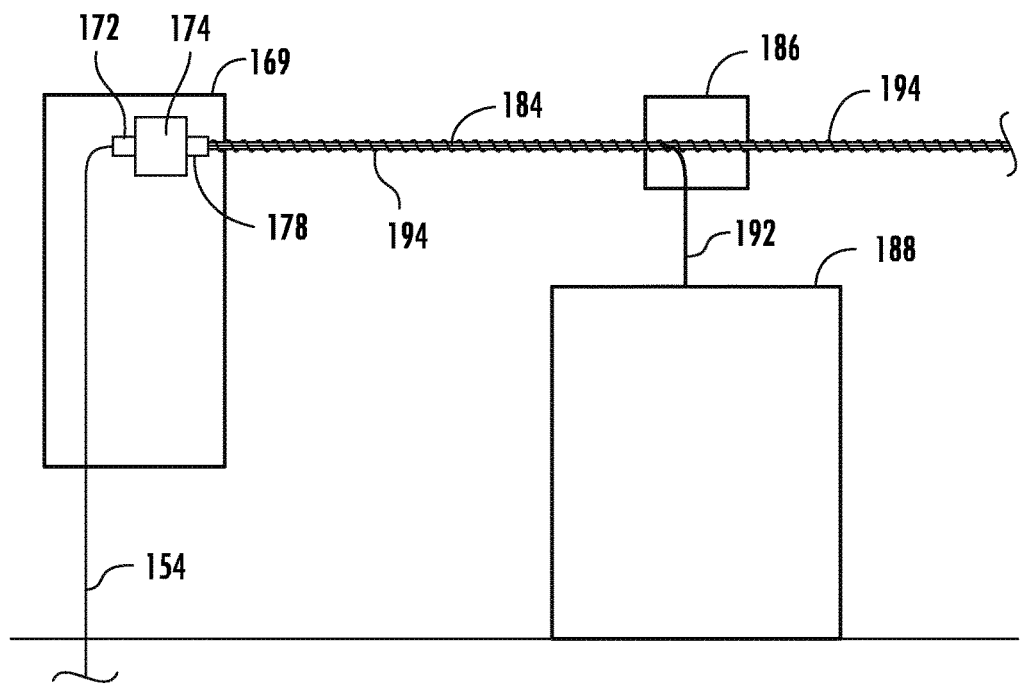
FIG. 14 is a schematic diagram of a bundled drop cable extending from a FDT to a subscriber premises located on a distribution level of the MDU.

Referring now to FIG. 14, the portion of the fiber optic networks 152, 252, 352, 452, 552 at the distribution level 164, 166, 168 is illustrated. The multi-fiber bundled drop cable 184 extends from the FDT 169 at the distribution level 164, 166, 168 to drop box 186 located at the subscriber premises 188. The multi-fiber bundled drop cable 184 includes multiple fiber optic cables 192 retained together by one or more helically wrapped external binders 194. One or more of the multiple fiber optic cables is separated from the multi-fiber bundled drop cable 184 by removing the multiple fiber optic cable from the retainage of the one or more external binders. The separated fiber optic cable 192 may then extend to the subscriber premises 188.

Figures 15, 15A:
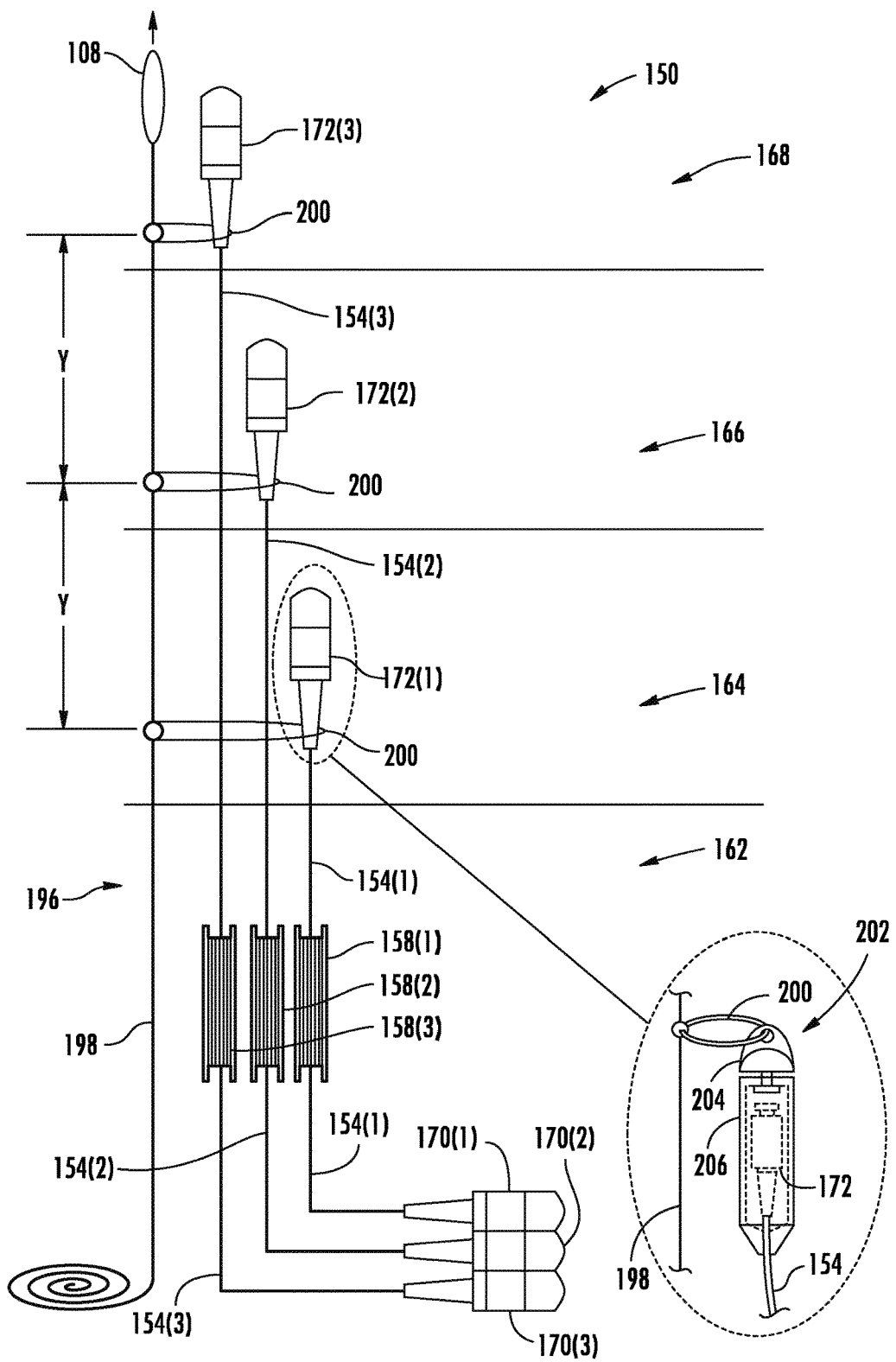
FIG. 15 is a schematic diagram of an elevation view of an exemplary preconnectorized riser cable installation assembly with a plurality of preconnectorized riser cables being extended from payout reels located at a lower level by a leader with extending features attached to the leader at preset locations.
FIG. 15A is a detail view of an exemplary pull device assembly which may be attached to the end of the riser cable to facilitate extending the riser cable from the payout reel.

FIG. 15 is a schematic diagram of an elevation view of an exemplary preconnectorized riser installation assembly 196 with a plurality of preconnectorized riser cables 154(1), 154(2), 154(3) being extended from respective payout reels 158(1), 158(2), 158(3) located at a lower level 162 by a leader 198 with extending features 200 attached to the leader 198 at preset locations at a distance "Y" along the length of the leader 198. The extending feature 200 may be any type of loop, hook, swivel, or the like, configured to attach to the second multi-fiber connectors 172(1), 172(2), 172(3), or to some type of pull device attached to the second multi-fiber connectors 172(1), 172(2), 172(3) to provide for safely and effectively paying out the riser cables 154(1), 154(2), 154(3).

FIG. 15A is a detail view of a pull device assembly 202 which may be attached to the end of the riser cable 154 to facilitate extending the riser cable 154 from the payout reel 158. The pull device assembly 202 attaches to the riser cable 154 around the second multi-fiber connector 172 enclosing the second multi-fiber connector 172, boot and a portion of the riser cable 154. The pull device assembly 202 has a swivel end 204 and a body 206. The body 206 may enclose and/or support the second multi-fiber connectors 172. The swivel end 204 is allowed to rotate freely and independently of the body 206 and, therefore, the second multi-fiber connector 172 and the riser cable 154. The swivel end 204 comprises a hole through which the extending feature 200 inserts. As the riser cable 154 is pulled through the MDU 150 particularly in conduit using a pull loop 208 attached to the end of the leader 198, and the extending feature 200 attached to the swivel end 204, the swivel end 204 it is allowed to independently rotate from the rest of the pull device assembly 202. This independent rotation eliminates twisting of the riser cable 154 and the second multi-fiber connector 172. In this manner, as the leader 198 is pulled through the MDU 150 particularly in conduit, the leader 198, the extending feature 200 and the swivel end 204 reduce or may eliminate any induce additional torsional stresses on the riser cable 154 and/or the second multi-fiber connector 172.

Referring again to FIG. 15, the distance "Y" is preset to a certain value depending on the distance between adjoining distribution levels 164, 166, 168. As examples, the distance "Y" may be set at 10 feet, 12 feet, 14 feet, 15 feet, and the like. In this manner, as the leader 198 is pulled through the MDU 150, riser cables 154(1), 154(2), 154(3) each pays out to a point that will align, generally, with each respective distribution level 164, 166, 168 of the MDU 150. Any riser cable 154 slack due to the presetting of the distance "Y" or otherwise may be stored on the respective payout reel 158(1), 158(2), 158(3) and/or loosely in a patch panel enclosure 160 and/or a slack enclosure (not shown in FIG. 15). Additionally, slack may be stored loosely, on the payout reels 158(1), 158(2), 158(3) and/or the FDT 169 at one or more of the distribution levels 164, 166, 168. Each second multi-fiber connectors 172(1), 172(2), 172(3), may then be connected to the respective multi-fiber adapter assembly 174 removably mounted in the FDT 169 located at the respective distribution level 164, 166, 168. Additionally, the first multi-fiber connectors 170(1), 170(2), 170(3) attached to respective riser cables 154(1), 154(2), 154(3) may be connected to the respective multi-fiber adapter assembly 174 removably mounted in the patch panel enclosure 160.

Figure 16:
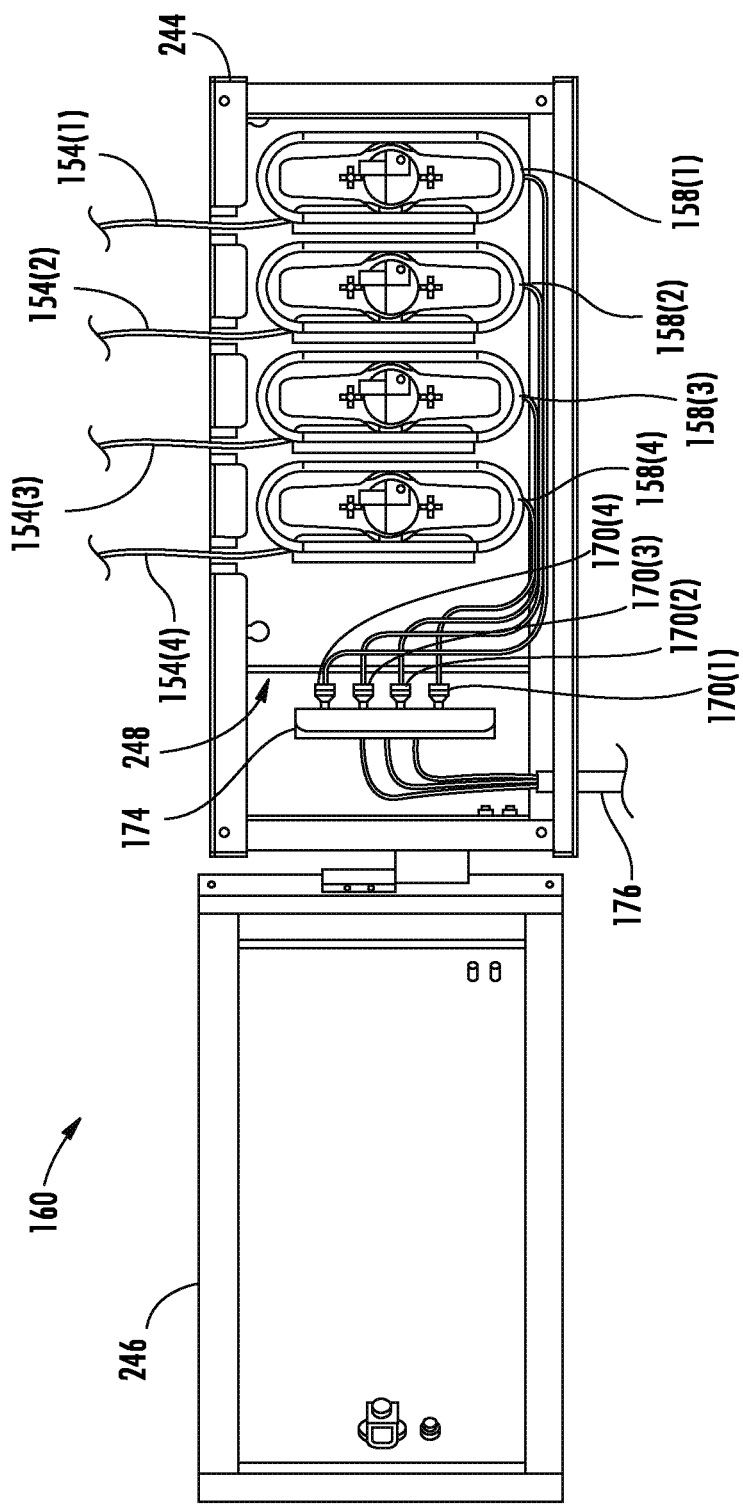
FIG. 16 is a schematic diagram of front elevation views of an exemplary patch panel enclosure with a multi-fiber adapter assembly and multiple payout reels removably mounted therein.

FIG. 16 is a schematic diagram of front elevation views of an exemplary patch panel enclosure 160 with a multi-fiber adapter assembly 174 and multiple payout reels 158 removably mounted therein. The patch panel enclosure 160 has a door 144 hingedly attached thereto. The door 144 closes to restrict and/or prohibit access to the interior 246 of the patch panel enclosure 160 and the components mounted therein, and opens to allow access to the interior 246 and the components mounted therein. In FIG. 16, a multi-fiber adapter assembly 174 and multiple payout reels 158(1), 158(2), 158(3), 158(4), are shown mounted in the interior 246. The riser cables 154(1), 154(2), 154(2), 154(2) are shown as having been paid out from the payout reels 158(1), 158(2), 158(3), 158(4) which are now being used to store riser cable 154(1), 154(2), 154(2), 154(2) slack. The payout reels 158(1), 158(2), 158(3), 158(4) are shown as being transformable to a smaller form factor allowing for storing in the patch panel enclosure 160. The first multi-fiber connectors 170(1), 170(2), 170(3), 170(4) route and connect to one side of the with the multi-fiber adapter assembly 174. The distribution cable 176 connects to the other end of the multi-fiber adapter assembly 174 and extends from the bottom of the patch panel enclosure 160. Mounting holes 248 allow the patch panel enclosure 160 to be wall mounted.

Figure 17:
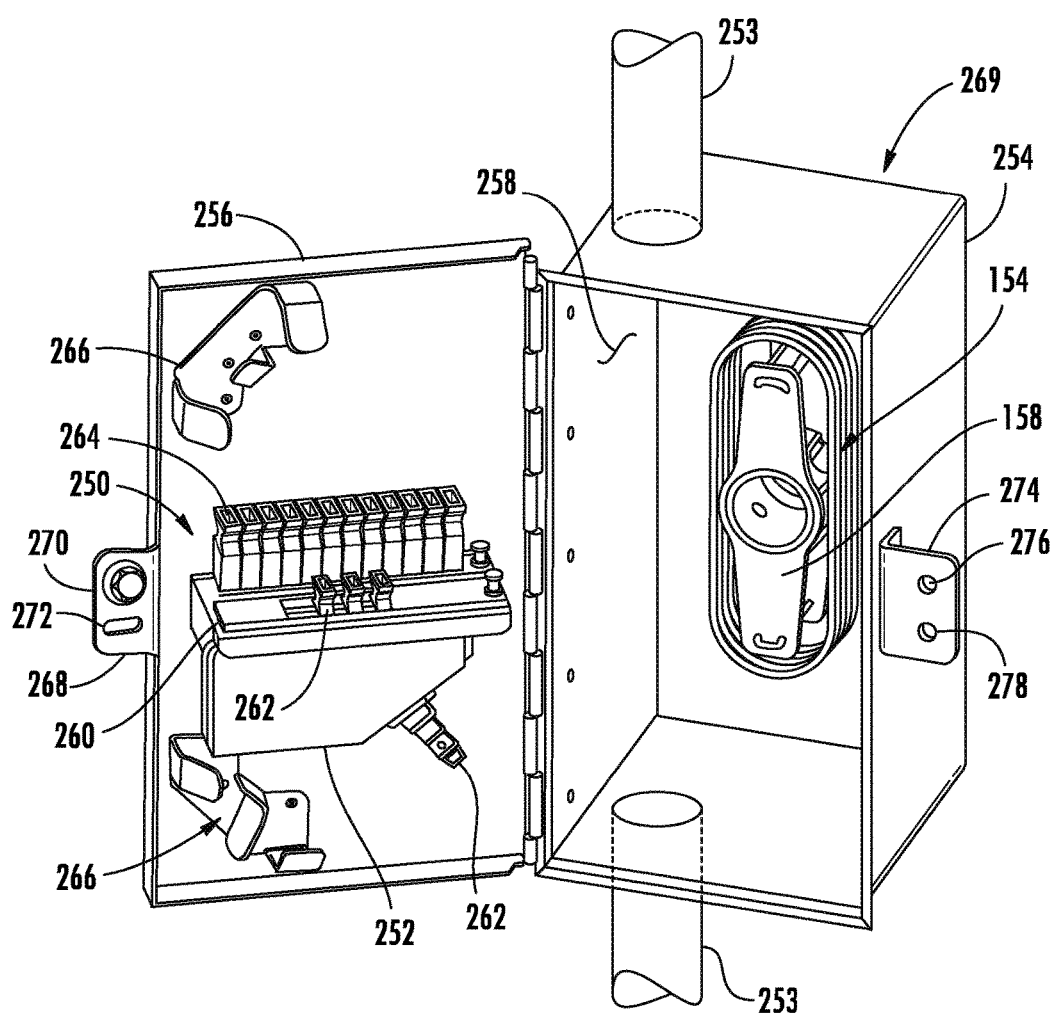
FIG. 17 is a schematic diagram of a front perspective view of an exemplary FDT having a module with multi-fiber adapters and single fiber adapters and a payout reel removably mounted therein, wherein the FDT is configured to be mounted in-line with and supported by the conduit carrying the riser cable.

FIG. 17 is a schematic diagram of a front, perspective view of a FDT 1169 having a payout reel 158 and an adapter module assembly 250 with an adapter module 252 and a multi-fiber adapter assembly 174 removably mounted therein. In the embodiment depicted in FIG. 17, the FDT 1169 is configured to be mounted in-line with and supported by conduit 253 carrying the riser cable 154 and may be mounted at one or more distribution levels 164, 166, 168. The FDT 269 has an enclosure 254 with a door 256 hingedly attached thereto. The door 256 closes to restrict and/or prohibit access to the interior 258 of the FDT 129 and the components mounted therein, and opens to allow access to the interior 258 and the components mounted therein. In FIG. 17, the adapter module assembly 250 is shown mounted to the door 256 in the interior 258. The adapter module assembly 250 comprises a connector panel 260 to which the adapter module 252 and the multi-fiber adapter assembly 174 attach. The multi-fiber adapter assembly 174 has multi-fiber adapters 260. Additionally, the adapter module 252 has a multi-fiber adapter 262 and multiple single fiber adapters 264. In this manner, the adapter module assembly 250 can receive and connect the riser cable 154 to drop cables 184 extending to subscriber premises 188 located on the distribution levels 164, 166, 168.

Routing guides 266 to route and manage fiber optic cables mount to the door 256 in the interior 258 in addition to the adapter module assembly 250. The door 256 has a flange 268 having a tool lock mechanism 270 and a pad lock hole 272. A flange 274 on the enclosure 254 has a tool lock receiver 276 and pad lock hole 278, which mate with the tool lock mechanism 270 and a pad lock hole 272 when the door 256 is closed to provide for locking the FDT 269. The riser cable 154 is shown as having been paid out from the payout reel 148 which is now being used to store riser cable 144 slack. The payout reel 148 is shown as being transformable to a smaller form factor allowing for storing in the FDT 269.

Figure 18:
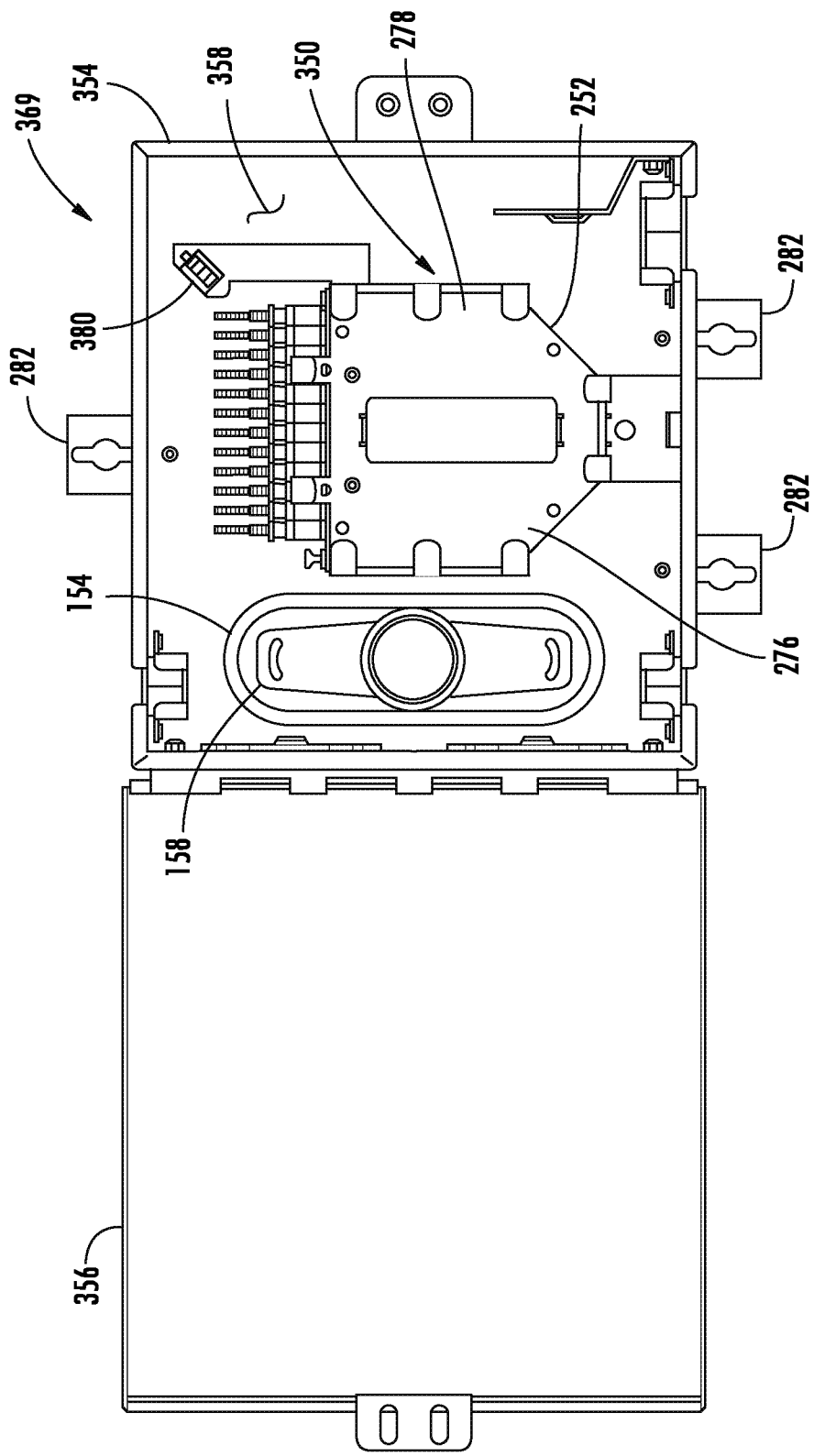
FIG. 18 is a schematic diagram of a front perspective view of an exemplary FDT having a module assembly with multi-fiber adapters and single fiber adapters pivotably mounted therein and a transformable payout reel removably mounted therein, wherein the FDT is configured to be wall or closet mounted.

FIG. 18 is a schematic diagram of a front perspective view of an exemplary FDT 369 having a payout reel 158 removably mounted therein and an adapter module assembly 350 pivotably mounted therein. The FDT 369 has an enclosure 354 with a door 356 hingedly attached thereto, and may be located at one or more distribution levels 164, 166, 168. The door 356 closes to restrict and/or prohibit access to the interior 358 of the FDT 369 and the components mounted therein, and opens to allow access to the interior 358 and the components mounted therein. The adapter module assembly 350 has a cradle 276 adapted to removably hold one or more adapter modules 252. The cradle 276 has a slack storage area 278 for storing the slack of drop cables 184 extending to subscriber premises 188 located at the distribution level 164, 166, 168. A routing guide 380 connecting to and extending from the cradle provides for drop cable 184 routing and management in the FDT 369. One or more mounting ears 282 extend from the enclosure 354 allowing the enclosure 354 to be mounted to a wall, for example in a closet, at the distribution level 164, 166, 168. The door 356 has a flange 368 having a tool lock mechanism 270 and a pad lock hole 272. A flange 274 on the enclosure 354 has a tool lock receiver 276 and pad lock hole 278, which mate with the tool lock mechanism 270 and a pad lock hole 272 when the door 256 is closed to provide for locking the FDT 369. The riser cable 154 is shown as having been paid out from the payout reel 158 which is now being used to store riser cable 154 slack. The payout reel 158 is shown as being transformable to a smaller form factor allowing for storing in the FDT 369.

Figure 19:
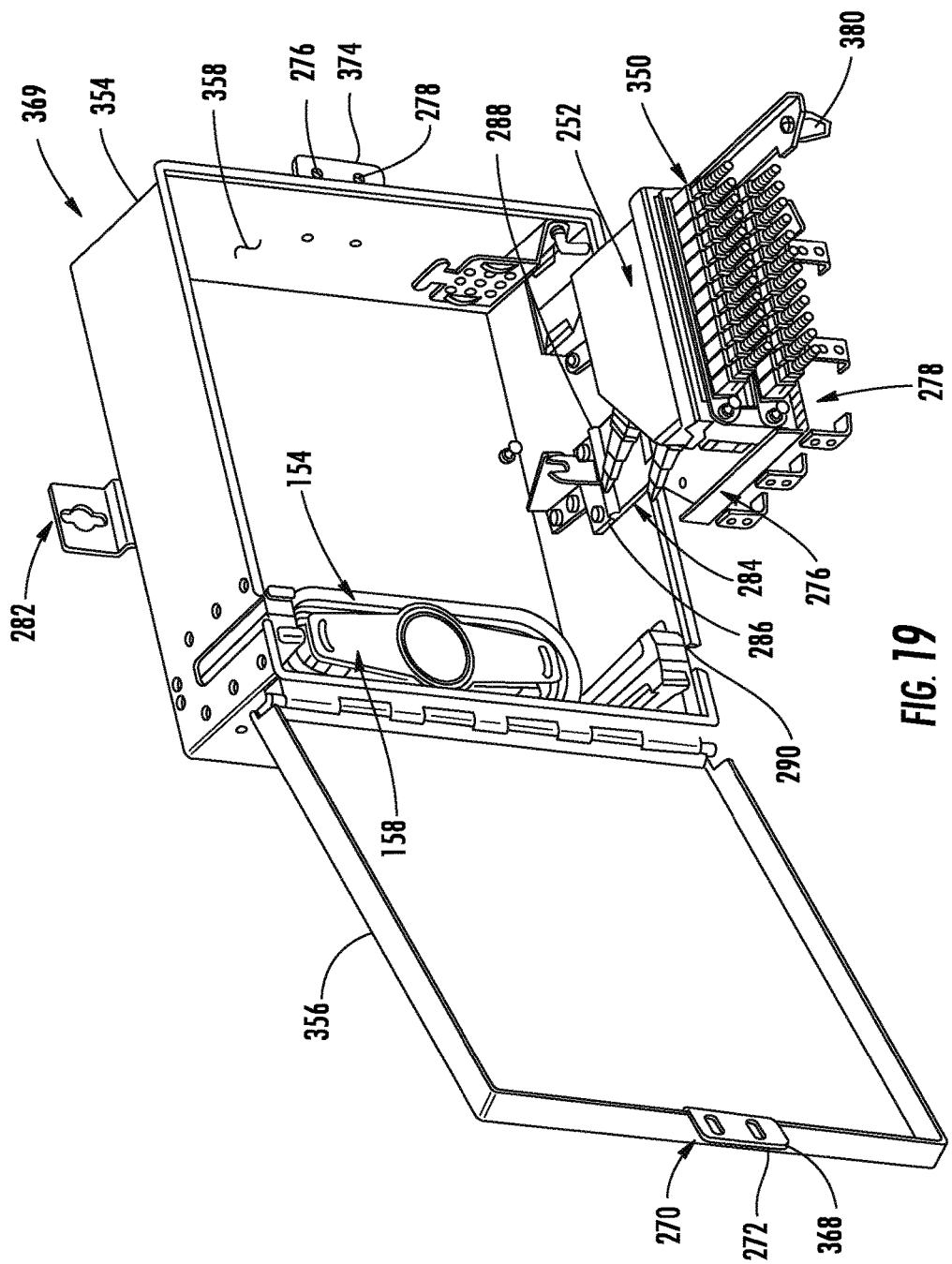
FIG. 19 is a schematic diagram of the front perspective view of the FDT of FIG. 14 with the module assembly pivoted to an open position.

FIG. 19 is a schematic diagram of the front, perspective view of the FDT 369 with the adapter module assembly 350 pivoted to an open position. The adapter module assembly 350 has a pivot assembly 384 connected to the bottom of the enclosure 354. In FIG. 19, the pivot assembly 384 is illustrated as a cradle bracket 286 and a cradle hinge 288. However, the pivot assembly 284 can be any mechanical or structural design that allows the adapter module assembly 350 to pivot. Sealing feature 290 allows the riser cable 154 and drop cables 184 to enter the enclosure 354 while maintaining the FDT 369 in an environmentally sealed condition. One or more strain relief brackets 292 provide strain relief for the riser cable 154 and drop cables 184 in the FDT 369.

Many modifications and other embodiments set forth herein will come to mind to one skilled in the art to which the embodiments pertain having the benefit of the teachings presented in the foregoing descriptions and the associated drawings. For example, the embodiments herein can be applied to any type of cable and fiber optic cable. For example, applying forces to convert the transformable cable reel 22 from the first reel configuration to the second reel configuration can be reversible using forces similarly oriented in the opposite directions.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:
1. A transformable cable reel fixture, comprising:
    a fixture base comprising a base surface;
    a center cantilever attached to a center portion of the base surface and extending orthogonally from the base surface about a center axis of the fixture base; and at least three flexible arcuate cantilevers disposed in a circumferential arrangement on the fixture base, the at least three flexible arcuate cantilevers each comprising a cable mounting surface configured to form a portion of a reel configuration of a cable reel, the cable mounting surface opposite the center cantilever;

wherein the transformable cable reel fixture is configured for mounting cable to the cable mounting surfaces of the at least three flexible arcuate cantilevers.

2. The transformable cable reel fixture of claim 1, further comprising a cable wound or spooled around the at least three flexible arcuate cantilevers.

3. The transformable cable reel fixture of claim 1, wherein the at least three cantilevers are spaced around the circumferential edge equal distant from each other.

4. The transformable cable reel fixture of claim 1, wherein the at least three cantilevers comprise four cantilevers spaced around the circumferential edge equally distant from each other by $\pi/2$ radians.

5. The transformable cable reel fixture of claim 1, wherein the center cantilever is configured for insertion into a similarly sized orifice.

6. The transformable cable reel fixture of claim 1, wherein the center cantilever is configured to serve as an axis for the transformable cable reel to pivot.

7. The transformable cable reel fixture of claim 1, wherein the at least three flexible arcuate cantilevers are disposed in a circumferential arrangement on the base surface.

8. The transformable cable reel fixture of claim 1, further comprising at least one secondary cantilever attached to the base surface and extending orthogonally from the base surface, the at least one secondary cantilever positioned between the center cantilever and a point on a circumference defined by the at least three flexible arcuate cantilevers.

* * * * *